(12) United States Patent
Ledvina et al.

(10) Patent No.: US 12,177,378 B2
(45) Date of Patent: *Dec. 24, 2024

(54) RANGING BETWEEN MOBILE DEVICES

(71) Applicant: Apple Inc., Cupertino, CA (US)

(72) Inventors: Brent M. Ledvina, San Francisco, CA (US); Marc J. Krochmal, Santa Clara, CA (US); Robert W. Brumley, Menlo Park, CA (US); Sriram Hariharan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,650

(22) Filed: Oct. 31, 2022

(65) Prior Publication Data

US 2023/0051718 A1 Feb. 16, 2023

Related U.S. Application Data

(60) Continuation of application No. 17/025,160, filed on Sep. 18, 2020, now Pat. No. 11,516,337, which is a
(Continued)

(51) Int. Cl.
*H04W 4/02* (2018.01)
*G06F 3/04817* (2022.01)
(Continued)

(52) U.S. Cl.
CPC .... *H04M 1/72457* (2021.01); *G06F 3/04817* (2013.01); *H04L 9/30* (2013.01);
(Continued)

(58) Field of Classification Search
CPC ......... H04M 1/72572; H04M 1/72552; H04W 12/0013; H04W 4/023; H04W 4/026;
(Continued)

(56) References Cited

U.S. PATENT DOCUMENTS

| 8,190,692 B1 | 5/2012 | Zilka |
| 9,548,770 B1 | 1/2017 | Pawar et al. |

(Continued)

FOREIGN PATENT DOCUMENTS

| CN | 101334467 A | 12/2008 |
| CN | 101394229 A | 3/2009 |

(Continued)

OTHER PUBLICATIONS

"International Search Report and Written Opinion," mailed Jan. 30, 2020, in International Application No. PCT/US2019/053448. 24 pages.

(Continued)

*Primary Examiner* — Khawar Iqbal
(74) *Attorney, Agent, or Firm* — Kilpatrick Townsend & Stockton LLP

(57) ABSTRACT

A mobile device can include ranging circuitry to determine distance to another mobile device. A first wireless protocol can establish an initial communication session to perform authentication and/or exchange ranging settings. A second protocol can perform ranging, and other wireless protocols can transmit content. In one example, the distance information can be used to display a relative position of another device on a user interface of a sending device. The user interface can allow a user to quickly and accurately select the recipient device for sending the data item. As another example, the distance information obtained from ranging can be used to trigger a notification (e.g., a reminder) to be output from a first mobile device or used to display a visual indicator on a receiving device. Proximity of a device (e.g., as determined by a distance) can be used to suggest recipient for a new communication.

20 Claims, 18 Drawing Sheets

Related U.S. Application Data division of application No. 16/586,281, filed on Sep. 27, 2019, now Pat. No. 11,019,195.

(60) Provisional application No. 62/738,915, filed on Sep. 28, 2018.

(51) Int. Cl.
*H04L 9/30* (2006.01)
*H04L 69/18* (2022.01)
*H04M 1/72436* (2021.01)
*H04M 1/72457* (2021.01)
*H04W 4/12* (2009.01)
*H04W 8/18* (2009.01)
*H04W 12/033* (2021.01)
*H04W 12/06* (2021.01)
*H04W 12/63* (2021.01)

(52) U.S. Cl.
CPC ........ *H04L 69/18* (2013.01); *H04M 1/72436* (2021.01); *H04W 4/023* (2013.01); *H04W 4/026* (2013.01); *H04W 4/12* (2013.01); *H04W 8/183* (2013.01); *H04W 12/033* (2021.01); *H04W 12/06* (2013.01); *H04W 12/63* (2021.01)

(58) Field of Classification Search
CPC ....... H04W 4/12; H04W 8/183; H04W 12/06; H04W 12/03; H04W 4/02; G06F 3/04817; H04L 9/30; H04L 69/18
See application file for complete search history.

(56) References Cited

U.S. PATENT DOCUMENTS

| | | | |
|---|---|---|---|
| 9,813,466 B2 | 11/2017 | Hassan | |
| 9,860,297 B2 | 1/2018 | Palin | |
| 9,866,997 B2 | 1/2018 | Hughes, Jr. | |
| 9,883,348 B1 | 1/2018 | Walker et al. | |
| 10,338,768 B1 | 7/2019 | Gordon et al. | |
| 10,412,545 B1 | 9/2019 | Liu et al. | |
| 10,452,150 B2 | 10/2019 | Bostick et al. | |
| 10,471,932 B2 | 11/2019 | Kim et al. | |
| 10,575,174 B2 | 2/2020 | Hassan et al. | |
| 10,735,900 B1 | 8/2020 | Werner et al. | |
| 10,917,784 B2 | 2/2021 | Golsch | |
| 11,451,924 B2 | 9/2022 | Werner et al. | |
| 2004/0192331 A1 | 9/2004 | Gorday et al. | |
| 2004/0210844 A1 | 10/2004 | Pettinati et al. | |
| 2009/0111447 A1 | 4/2009 | Nurmi | |
| 2010/0144274 A1 | 6/2010 | Mcdowall et al. | |
| 2011/0256895 A1 | 10/2011 | Palin et al. | |
| 2013/0102324 A1 | 4/2013 | Qiu et al. | |
| 2013/0203448 A1 | 8/2013 | Kang et al. | |
| 2014/0068469 A1 | 3/2014 | Lee | |
| 2015/0094035 A1 | 4/2015 | Jung et al. | |
| 2015/0172902 A1* | 6/2015 | Kasslin | H04W 8/005 370/328 |
| 2016/0080907 A1 | 3/2016 | Saleem | |
| 2016/0084937 A1 | 3/2016 | Lin | |
| 2016/0100311 A1* | 4/2016 | Kumar | H04W 12/06 726/7 |
| 2016/0157284 A1 | 6/2016 | Kim et al. | |
| 2016/0234008 A1 | 8/2016 | Hekstra et al. | |
| 2016/0323863 A1* | 11/2016 | Park | H04W 4/70 |
| 2017/0026778 A1* | 1/2017 | Yamada | H04W 12/08 |
| 2017/0048671 A1 | 2/2017 | Sridhar et al. | |
| 2017/0131381 A1 | 5/2017 | Malik et al. | |
| 2017/0142767 A1 | 5/2017 | Furubayashi et al. | |
| 2017/0228935 A1 | 8/2017 | Foster et al. | |
| 2017/0249797 A1 | 8/2017 | Elie et al. | |
| 2017/0302778 A1 | 10/2017 | Halavee et al. | |
| 2018/0019964 A1 | 1/2018 | Larson | |
| 2018/0025597 A1 | 1/2018 | Jenkins et al. | |
| 2018/0042061 A1 | 2/2018 | Iinuma | |
| 2018/0068505 A1 | 3/2018 | Mullett | |
| 2018/0077538 A1 | 3/2018 | Matus | |
| 2018/0099643 A1 | 4/2018 | Golsch | |
| 2018/0183596 A1 | 6/2018 | Deshpande et al. | |
| 2018/0234797 A1 | 8/2018 | Ledvina et al. | |
| 2018/0276367 A1 | 9/2018 | Benson | |
| 2018/0290020 A1 | 10/2018 | Vissa | |
| 2018/0295088 A1* | 10/2018 | Larson | H04L 51/222 |
| 2019/0020975 A1 | 1/2019 | Chhabra et al. | |
| 2019/0026731 A1 | 1/2019 | Neafsey | |
| 2019/0051072 A1 | 2/2019 | Okada | |
| 2019/0061689 A1 | 2/2019 | Breer et al. | |
| 2019/0066422 A1 | 2/2019 | Breer et al. | |
| 2019/0104396 A1* | 4/2019 | Yu | H04W 12/04 |
| 2019/0116619 A1* | 4/2019 | Hauck | H04L 63/0869 |
| 2019/0135229 A1 | 5/2019 | Ledvina | |
| 2019/0141645 A1* | 5/2019 | Abouelseoud | H04W 40/02 |
| 2019/0141786 A1* | 5/2019 | Park | H04W 4/80 |
| 2019/0171465 A1 | 6/2019 | Benson et al. | |
| 2019/0179512 A1* | 6/2019 | Gordon | G06T 19/006 |
| 2019/0200203 A1* | 6/2019 | Jiang | H04L 63/0861 |
| 2019/0222546 A1* | 7/2019 | Larson | H04L 51/222 |
| 2019/0263356 A1 | 8/2019 | Golsch et al. | |
| 2019/0287062 A1* | 9/2019 | Skaaksrud | G05D 1/0274 |
| 2019/0304226 A1 | 10/2019 | Golsch et al. | |
| 2019/0318075 A1 | 10/2019 | Dupart et al. | |
| 2020/0027068 A1* | 1/2020 | Studnicka | G06F 3/04883 |
| 2020/0077326 A1 | 3/2020 | Abouelseoud et al. | |
| 2020/0128354 A1 | 4/2020 | Smith et al. | |
| 2020/0169946 A1 | 5/2020 | Abouelseoud et al. | |
| 2020/0293966 A1* | 9/2020 | Gupta | G06Q 10/06312 |
| 2020/0348765 A1 | 11/2020 | Gurovich et al. | |
| 2020/0359170 A1 | 11/2020 | Werner et al. | |
| 2021/0258744 A1* | 8/2021 | Lee | H04W 76/14 |
| 2022/0369086 A1* | 11/2022 | Yamada | H04W 12/04 |
| 2023/0096269 A1* | 3/2023 | Goldstein | H04W 4/21 455/41.2 |

FOREIGN PATENT DOCUMENTS

| | | | |
|---|---|---|---|
| CN | 101461221 A | 6/2009 | |
| CN | 102066969 A | 5/2011 | |
| CN | 102106118 A | 6/2011 | |
| CN | 102713664 A | 10/2012 | |
| CN | 106131762 A | 11/2016 | |
| CN | 108291960 A | 7/2018 | |
| EP | 2 632 095 A2 | 8/2013 | |
| EP | 3 002 720 A1 | 2/2014 | |
| GB | 2466049 A | 6/2010 | |
| IL | 256288 B | 6/2019 | |
| JP | 2005291723 A | 10/2005 | |
| KR | 20020062719 A | 7/2002 | |
| KR | 20160113144 A | 9/2016 | |
| WO | 2016057678 A1 | 4/2016 | |
| WO | WO-2017181132 A2 * | 10/2017 | H04L 63/061 |

OTHER PUBLICATIONS

Invitation to Pay Additional Fees mailed Dec. 5, 2019, in International Application No. PCT/US2019/053448. 19 pages.
"Notice of Allowance," dated Mar. 25, 2020, in U.S. Appl. No. 16/573,422. 13 pages.
"Non-Final Office Action," mailed Aug. 14, 2020, in U.S. Appl. No. 16/586,281. 18 pages.
"Notice of Allowance," mailed Jan. 22, 2021, in U.S. Appl. No. 16/586,281, 8 pages.
"European Search Report," mailed Oct. 15, 2021, in EP Application No. 21180099.0-1212. 8 pages.
"Examination Report No. 1 for Standard Patent Application," mailed Nov. 4, 2021, in Australian Patent Application No. 2019346631. 2 pages.
U.S. Appl. No. 16/914,111 , Non-Final Office Action, Mailed on Feb. 22, 2022, 15 pages.
IN202117010127 , "First Examination Report", Feb. 1, 2022, 6 pages.

(56) References Cited

OTHER PUBLICATIONS

AU2021204198 "First Examination Report", Apr. 21, 2022, 3 pages.
U.S. Appl. No. 16/914,111, Notice of Allowance, Mailed on Jun. 8, 2022, 8 pages.
IN202118027186, "First Examination Report", Aug. 1, 2022, 6 pages.
Application No. KR10-2021-7007547, Office Action, Mailed on Aug. 1, 2022, 10 pages. English Translation on pp. 1-5.
U.S. Appl. No. 16/914,111, "Notice of Allowability", Aug. 23, 2022, 3 pages.
Non-Final Office Action dated Oct. 12, 2022, in related U.S. Appl. No. 17/313, 194 (13 pages).
"Notice of Acceptance of Patent Application," mailed Nov. 15, 2022, in Australian Patent Application No. 2019346631. 3 pages.
"Notice of Final Rejection," mailed Nov. 1, 2022, in Korean Patent Application No. 10-2021-7007547. 7 pages (includes English translation).
"Final Office Action," mailed Feb. 22, 2022, in U.S. Appl. No. 17/028,160. 36 pages.
"Non-Final Office Action," mailed Oct. 22, 2021, in U.S. Appl. No. 17/028,160. 33 pages.
"Notice of Allowance," mailed Aug. 8, 2022, in U.S. Appl. No. 17/028,160. 8 pages.
"Notice of Decision to Grant," mailed May 1, 2023, in Korean Application No. 10-2021-7019842. 9 pages which includes English translation of the claims.
"Notice of Decision to Grant," mailed Feb. 14, 2023, from the European Patent Office in Application No. 21 180 099.0-1216.
"Intention to Grant," mailed Feb. 6, 2023, in European Patent Application No. 19 790 924.5-1216. 96 pages.
"Notice of Acceptance for Patent Application," mailed Feb. 23, 2023, from the Australian Government in Application No. 2021204198. 3 pages.
"Intention to Grant," mailed Feb. 14, 2023, from the European Patent Office in Application No. 21 180 099.0-1216. 9 pages.
"Notice of Preliminary Rejection," mailed Feb. 1, 2023, from the Korean Intellectual Property Office in Application No. 10-2021-7019842. 5 pages (includes English translation).
"Notice of Allowance," mailed Feb. 10, 2023, in U.S. Appl. No. 17/313,194. 11 pages.
"Notice of Decision to Grant," mailed Mar. 2, 2023, from the Korean Intellectual Property Office in Application No. 10-2021-7007547. 8 pages (includes English translation of allowed claims).
European Extended Search Report, mailed Jun. 22, 2023, in Application No./Patent No. 23168293.1-1216. 14 pages.
European Extended Search Report, mailed Jun. 22, 2023, in Application No./Patent No. 23168304.6-1216. 11 pages.
Office Action issued in China Application No. CN202010352116.7, dated Aug. 19, 2023, in 16 pages.
Office Action issued in Korea Application No. KR10-2023-7026485, dated Oct. 4, 2023, in 11 pages.
"Notice of Final Rejection," mailed Jan. 2, 2024, in Korean Patent Application No. 10-2023-7026485. 6 pages, includes English translation.
Australian Patent Application No. AU2023203523 , "First Examination Report", May 21, 2024, 3 pages.
Chinese Patent Application No. CN201980058972.7 , Office Action, Mailed on Jun. 7, 2024, 9 pages (2 pages of English Translation and 7 pages of Official Copy).
Indian Patent Application No. IN202318010513 , "First Examination Report", Jul. 24, 2024, 6 pages.
Korean Patent Application No. KR10-2023-7026485 , Notice of Decision to Grant, Mailed on Jun. 3, 2024, 7 pages (2 pages of English Translation and 5 pages of Official Copy).
Chinese Patent Application No. CN201980058972.7 , Notice of Decision to Grant, Mailed On Oct. 14. 2024, 6 pages (3 page of English translation and 5 pages of official language copy).
Chinese Patent Application No. CN202010352116.7 , Office Action, Mailed On Sep. 25, 2024, 14 pages (7 pages of English summary and 7 pages of official language copy).
Indian Patent Application No. IN202318010511 , "First Examination Report", Oct. 31, 2024, 5 pages.

* cited by examiner

RANGING BETWEEN MOBILE DEVICES

CROSS-REFERENCES TO RELATED APPLICATIONS

This application is a continuation of U.S. patent application Ser. No. 17/025,160, filed Sep. 18, 2020, entitled "Ranging Between Mobile Devices," which is a divisional application of U.S. patent application Ser. No. 16/586,281, filed Sep. 27, 2019, entitled "Ranging Between Mobile Devices," now U.S. Pat. No. 11,019,195, which claims the benefit of U.S. Provisional Application No. 62/738,915, filed Sep. 28, 2018, entitled "Ranging Between Mobile Devices." The disclosures of these applications are hereby incorporated by reference herein in their entireties.

BACKGROUND

Mobile devices (e.g. smart phone) can store a variety of content and perform a variety of functions. Users typically carry a smartphone wherever they go and have it readily available. But, in today's hectic world, users have increasing demands on such mobile devices to make their lives easier and more productive. Accordingly, it is desirable to provide improved functionality in mobile devices (e.g., communication assistance and timely notifications).

BRIEF SUMMARY

According to various embodiments, a mobile device can include ranging circuitry that can determine the relative distance between mobile devices. For example, time-of-flight measurements can be performed using ultra-wideband (UWB) pulses transmitted between the mobile devices. The ranging can provide distance information, which can be used to determine a relative position of another device, e.g., a distance value and/or an angular (orientation) information between the two devices. The ranging functionality can be implemented in combination with another wireless protocol, which can establish an initial communication session, e.g., to perform authentication and/or exchange ranging settings. Additional wireless protocols can also be used, e.g., for transmission of content from one device to the other.

The distance information obtained from the ranging can be used in a variety of ways. For example, the distance information can be used to display a relative position of the receiving mobile device on a screen of a sending mobile device, which is to send a data item. Such a user interface can allow a user to quickly and accurately select the recipient device for sending the data item, e.g., a video, audio, or a link to an application, as may be used to hand off an application at a particular location (e.g., page) in an application. As another example, the distance information obtained from ranging can be used to trigger a notification (e.g., a reminder) to be output from a first mobile device. As yet another example, the distance information can be used to perform a sharing session between two devices, e.g., if the distance information is sufficiently close for two authenticated devices.

According to some embodiments, proximity information may be used, which may include a presence or distance information of a neighboring device, as determined using wireless communications. Contact information for neighboring devices that belong to known contacts of the user device can be retrieved, and the proximity of a neighboring device can be used to suggest a recipient for a new communication (e.g., new email or text message).

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
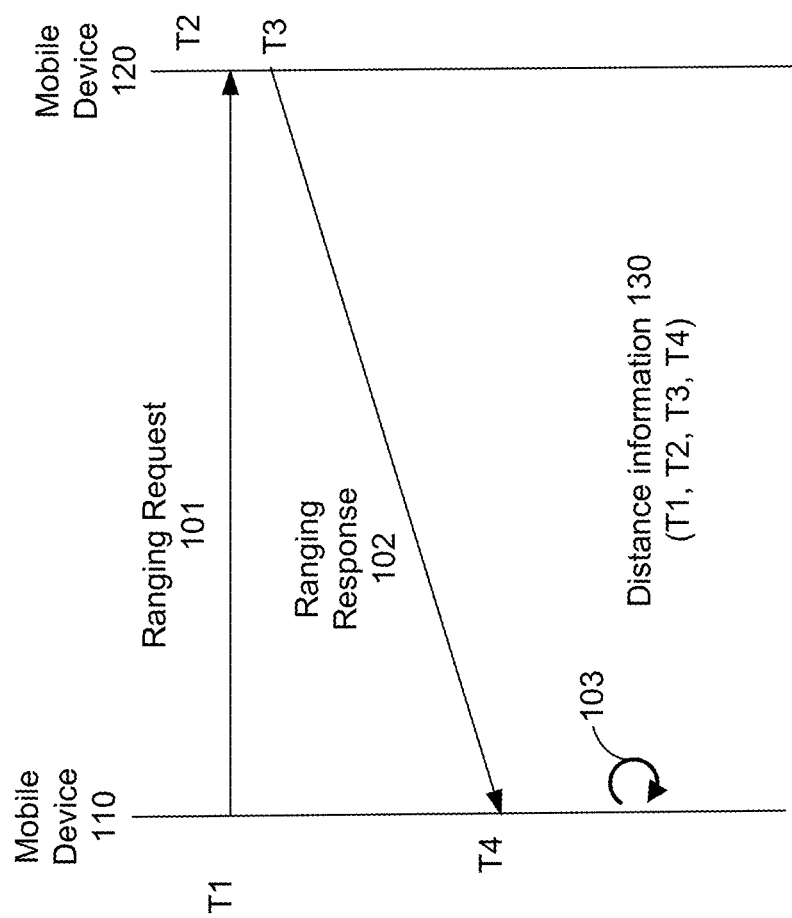
FIG. 1 shows a sequence diagram for performing a ranging measurement between two mobile devices according to embodiments of the present disclosure.

Mobile devices may use GPS or other location circuitry to determine the location of the mobile device. For example, a map application can show an approximate location of the mobile device on a map. But, such techniques for determining location are typically determined relative some external reference frame that is fixed, and not to a variable reference frame, e.g., another mobile device.

In some embodiments, a mobile device can include ranging circuitry that can determine the relative distance between the mobile device and another mobile device. For example, time of flight measurements can be performed using ultra-wideband (UWB) pulses transmitted between the mobile devices. The ranging can provide distance information, which can be used to determine a relative position of one mobile device to another. As examples, the relative position can include a distance value, angular (orientation) information between the two devices, or both.

The ranging functionality can be implemented in combination with another wireless protocol, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

The distance information obtained from the ranging can be used in a variety of ways. For example, the distance information can be used to display a relative position of the receiving mobile device on a screen of a sending mobile device, which is to send a data item. Such a user interface can allow a user to quickly and accurately select the recipient device for sending the data item, e.g., a video, audio, or a link to an application, as may be used to hand off an application at a particular location (e.g., page) in an application.

As another example, the distance information obtained from ranging can be used to trigger a notification (e.g., a reminder) to be output from a first mobile device. For example, a first user of the first mobile device may wish to get a reminder when the first user is close to a second user, who has a second mobile device. The ranging capability can enable the first user to be reminded at an opportune time, e.g., when the two users are talking. Often, a person may forget to bring up an issue (e.g., to get back loaned money or an issue on a work project) until after the two users have already walked away from each other. Such reminder functionality, which uses the distance information obtained from the ranging between the two mobile devices, can solve such a problem. As another example, a user may want a notification (e.g., an alert) when a distance between the two devices is greater than a threshold, e.g., when the other device belongs to a child of a parent who is a user of a first device.

As yet another example, the distance information can be used to perform a sharing session between two devices, e.g., if the distance information is sufficiently close for two authenticated devices. For example, a user can place a first mobile device sufficiently close to a computer and potentially in a particular orientation (e.g., face up on the left side of the computer) in order to indicate a desire to share content from the first mobile device to the computer. The content can be transferred, e.g., after authentication and a user selection of an indicator on/from the computer, such as a visual indicator or an audio indicator.

In some embodiments, proximity information may be used, which may include a presence or distance information of a neighboring device, as determined using wireless communications. The existence of a contact's device nearby can be used to provide that contact as a suggested recipient of a new communication, e.g., an email or text message.

I. Ranging

In some embodiments, a mobile device can include circuitry for performing ranging measurements. Such circuitry can include one or more dedicated antennas (e.g., 3) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

FIG. 1 shows a sequence diagram for performing a ranging measurement between two mobile devices according to embodiments of the present disclosure. The two mobile devices may belong to two different users. The two users may know each other, and thus have each other's phone numbers or other identifiers. As described in more detail later, such an identifier can be used for authentication purposes, e.g., so ranging is not performed with unknown devices. Although FIG. 1 shows a single measurement, the process can be repeated to perform multiple measurements over a time interval as part of a ranging session, where such measurements can be averaged or otherwise analyzed to provide a single distance value, e.g., for each antenna.

Mobile device 110 (e.g., a smartphone) can initiate a ranging measurement (operation) by transmitting a ranging request 101 to a mobile device 120. Ranging request 101 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth low energy (BLE).

At T1, mobile device 110 transmits ranging request 101. At T2, mobile device 120 receives ranging request 101. T2 can be an average received time when multiple pulses are in the first set. Mobile device 120 can be expecting ranging request 101 within a time window based on previous communications, e.g., using another wireless protocol. The ranging wireless protocol and the another wireless protocol can be synchronized so that mobile device 120 can turn on the ranging antenna(s) and associated circuitry for a specified time window, as opposed to leaving them on for an entire ranging session.

In response to receiving ranging request 101, mobile device 120 can transmit ranging response 102. As shown, ranging response 102 is transmitted at time T3, e.g., a transmitted time of a pulse or an average transmission time for a set of pulses. T2 and T3 may also be a set of times for respective pulses. Ranging response 102 can include times T2 and T3 so that mobile device 110 can compute distance information. As an alternative, a delta between the two times (e.g., T3-T2) can be sent.

At T4, mobile device 110 can receive ranging response 102. Like the other times, T4 can be a single time value or a set of time values.

At 103, mobile device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2-T1+T4-T3. More complex calculations can also be used, e.g., when the times correspond to sets of times for sets of pulses and when a frequency correction is implemented.

B. Triangulation

In some embodiments, a mobile device can have multiple antennas, e.g., to perform triangulation. The separate measurements from different antennas can be used to determine a two-dimensional (2D) position, as opposed to a single distance value that could result from anywhere on a circle/sphere around the mobile device. The two-dimensional position can be specified in various coordinates, e.g., Cartesian or polar, where polar coordinates can comprise an angular value and a radial value.

Figure 2:
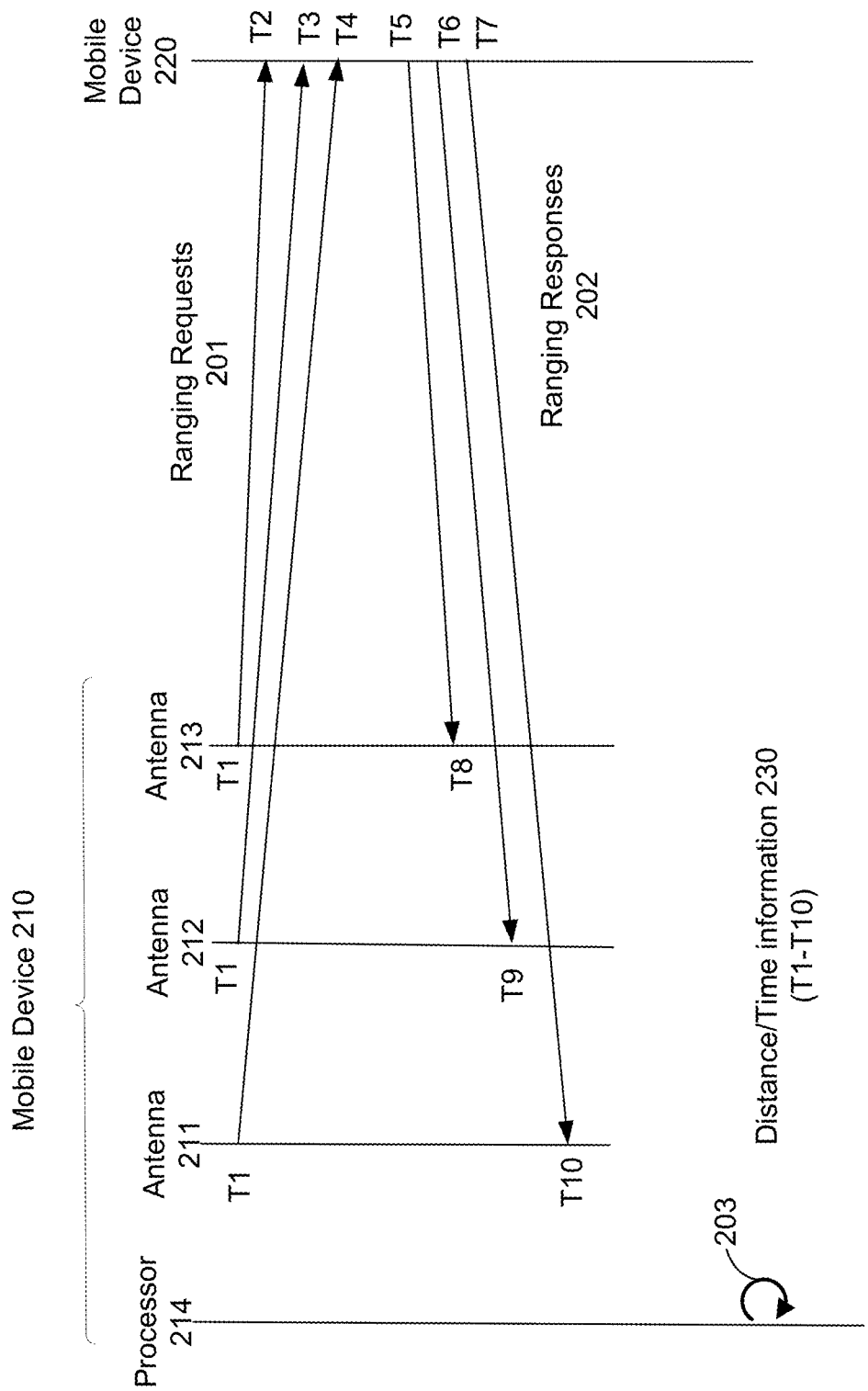
FIG. 2 shows a sequence diagram of a ranging operation involving a mobile device having three antennas according to embodiments of the present disclosure.

FIG. 2 shows a sequence diagram of a ranging operation involving a mobile device 210 having three antennas 211-213 according to embodiments of the present disclosure. Antennas 211-213 can be arranged to have different orientations, e.g., to define a field of view for performing ranging measurements.

In this example of FIG. 2, each of antennas 211-213 transmits a packet (including one or more pulses) that is received by mobile device 220. These packets can be part of ranging requests 201. The packets can each be transmitted at time T1, although they can be transmitted at different times in other implementations.

In some embodiments, mobile device 220 can have multiple antennas itself. In such an implementation, an antenna of mobile device 210 can send a packet to a particular antenna (as opposed to a broadcast) of mobile device 220, which can respond to that particular packet. Mobile device 220 can listen at a specified antenna so that both devices know which antennas are involved, or a packet can indicate which antenna a message is for. For example, a first antenna can respond to a received packet; and once the response is received, another packet can be sent to a different antenna. Such an alternative procedure may take more time and power.

The three packets of ranging requests 201 are received at times T2, T3, and T4, respectively. Thus, the antenna(s) (e.g., UWB antennas) of mobile device 220 can listen at substantially the same time and respond independently. Mobile device 220 provides ranging responses 202, which are sent at times T5, T6, and T7, respectively. Mobile device 210 receives the ranging responses at times T8, T9, and T10, respectively.

At 203, processor 214 of mobile device 210 computes distance information 230, e.g., as described herein. Processor 214 can receive the times from the antennas, and more specifically from circuitry (e.g., UWB circuitry) that analyzes signals from antennas 211-213. As described later, processor 214 can be an always-on-processor that uses less power than an application processor that can perform more general functionality. Distance information 230 can be used to determine a 2D or 3D position of mobile device 220, where such position can be used to configure a display screen of mobile device 210. For instance, the position can be used to determine where to display an icon corresponding to mobile device 220, e.g., which position in a list, which position in a 2D grid, or in which cluster of 1D, 2D, or 3D distance/position ranges to display the icon.

In some embodiments, to determine which ranging response is from which antenna, mobile device 220 can inform mobile device 210 of the order of response messages that are to be sent, e.g., during a ranging setup handshake, which may occur using another wireless protocol. In other embodiments, the ranging responses can include identifiers, which indicate which antenna sent the message. These identifiers can be negotiated in a ranging setup handshake.

Messages in ranging requests 201 and ranging responses 202 can include very little data in the payload, e.g., by including few pulses. Using few pulses can be advantageous. The environment of a mobile device (potentially in a pocket) can make measurements difficult. As another example, an antenna of one device might face a different direction than the direction from which the other device is approaching. Thus, it is desirable to use high power for each pulse, but there are government restrictions (as well as battery concerns) on how much power can be used within a specified time window (e.g., averaged over 1 millisecond). The packet frames in these messages can be on the order of 150 to 180 microseconds long.

C. UWB

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 GHz. Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a MAC layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests 201 can correspond to stage 1 and ranging responses 202 can correspond to stage 2. Such use of an indicator may be helpful when more than two devices are performing ranging operations in near each other.

The narrow pulses (e.g., ~1 ns width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging wave form of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

II. Setup and Ranging Using Two Protocols

As mentioned above, two wireless protocols can be used. An authentication and setup phase can be implemented using a first wireless protocol (e.g., BLE or other Bluetooth). A second (ranging) wireless protocol can be used to perform ranging measurements. Accordingly, a first wireless protocol link between a mobile device (e.g., a phone, tablet, or a watch) and another mobile device can be used for authentication, and then used to initiate and control a second wireless protocol (e.g., UWB) for ranging and exchange of distance information. For example, the first wireless protocol can provide a low power framework to negotiate security keys, ranging intervals, and to initiate ranging over UWB.

A. Flowchart

Figure 3:
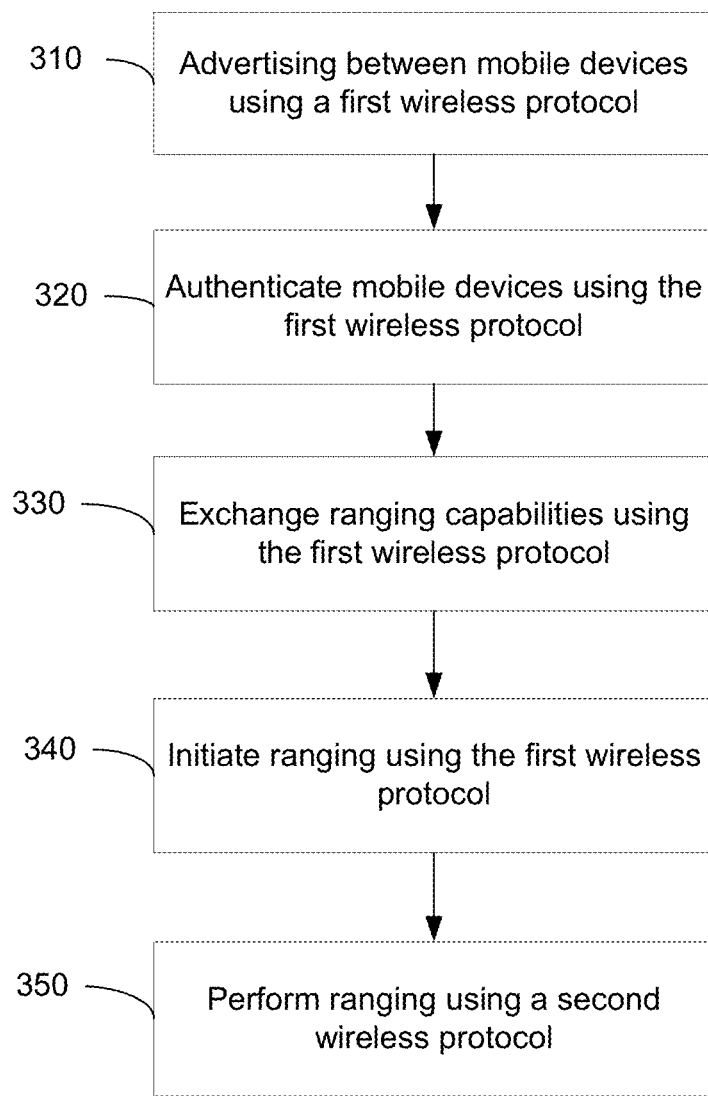
FIG. 3 is a flowchart illustrating a method for performing, by a first (sending) mobile device, a ranging operation with a second (receiving) mobile device involving two wireless protocols according to embodiments of the present disclosure.

FIG. 3 is a flowchart illustrating a method 300 for performing, by a first (sending) mobile device, a ranging operation with a second (receiving) mobile device involving two wireless protocols according to embodiments of the present disclosure. A first wireless protocol (e.g., Bluetooth) can be used for authentication, and a second wireless protocol (e.g., UWB) can be used for a ranging measurement.

At block 310, the mobile devices communicate advertisements using a first wireless protocol, e.g., BLE. A mobile device can transmit advertisements at a particular rate, and scan for advertisements from other mobile devices at a particular rate. The advertisements can include an authorization tag for each of the mobile devices to authenticate each other, e.g., to confirm that they have been registered with a third party, such as a manufacturer of the mobile devise. Such a third party (also called an authentication server) can generate the authentication tag using an identifier from the mobile device (or from a user of the mobile device) and provide to the mobile device, which can then transmit the authentication tag in an advertisement. As an example, an authentication tag can be generated using a hash function.

As examples, an identifier that is the authentication tag or is used to generate the authentication tag can include an identity address (e.g., media access control (MAC) address). For example, a unique 48-bit address can be used for each mobile device. An authentication tag can be updated periodically. Advertisements can also include an ID associated with the authentication tag (e.g., to retrieve additional information, such as a public certificate) and one or more commands, e.g., for a receiving mobile device to wake up.

At block 320, the mobile devices are authenticated using the first wireless protocol. For example, the receiving mobile device can detect an advertisement and obtain an authentication tag. The authentication tag can be compared to a list of authentication tags stored on the mobile device, e.g., corresponding to a contact list. When a mobile device adds a contact, the corresponding authentication tag can be obtained from an authentication server. The mobile device can then detect when an advertisement includes an authentication tag already stored on the mobile device. In some implementations, a new authentication tag can be sent to the authentication server to confirm that an identifier and an authentication tag match.

In response to authentication by the receiving mobile device or generally as an advertising mode, the receiving mobile device can also send an advertisement that includes an authentication tag. In other embodiments, authentication is not performed.

As part of the communication using the first wireless protocol, a secure communication channel can be established so that messages can be encrypted. For example, the communication can result in a shared secret being saved on both devices, where the shared secret can be used for future authentications (e.g., via a challenge response) and/or encryption of messages between the mobile devices.

At block 330, the mobile devices can exchange ranging capabilities (settings) using the first wireless protocol. The exchange of ranging capabilities can ensure that the signaling between mobile devices is performed in a consistent manner by both devices. Such exchange can allow the mobile device to adapt to different devices, e.g., ones with different numbers and types of antenna units. Example ranging capabilities can include specifying a format for ranging messages between the mobile devices, a frequency range to use, a number of antenna units for each device, and encryption protocols for ranging messages using the second wireless protocol.

At block 340, ranging can be initiated using the first wireless protocol. In some implementations, the initiation can be started by a ranging request message sent from a sending mobile device. The responding device can respond with a start notification event (message). Once the start notification event occurs, ranging can be performed using a second wireless protocol, e.g., by turning on corresponding radios within a specified time of receiving the start message. Such coordination between the first and second wireless protocols can synchronize the devices such that antenna(s) of the second protocol do not have to be on all the time, thereby saving power.

At block 350, ranging can be performed using a second wireless protocol (e.g., UWB). After the initiation signals using the first wireless protocol, the receiving device can begin scanning for ranging signals at a specified time using one or more antennas corresponding to the second wireless protocol. The one or more antennas can receive one or more ranging request messages and send one or more ranging response messages.

Circuitry of the receiving device can perform various levels of processing of such ranging messages, e.g., to determine time stamps. The sending device can receive the ranging response messages and determine time stamps for the transmission of the one or more ranging request messages and time stamps for the one or more ranging response messages, e.g., as shown in FIGS. 1 and 2. The sending device can use the times to determine a distance between the mobile devices. The ranging can be performed once, a specified number of times, or continue until a stop ranging request is processed.

A mobile device may have multiple antennas for the first wireless protocol (e.g., various forms of Bluetooth (BT), such as BLE). BT can use short-wavelength ultra-high frequency (UHF) radio waves in the ISM band from 2.4 to 2.485 GHz. Certain modes of the first wireless protocol can be used over a relatively long range. For example, one BT radio can increase a communication range by using a lower packet coding of 125 kbps or 500 kbps and by increasing a maximum transmission power (e.g., to +20 dBm). Such a radio can be used for both advertising and data packets and provide range up to 100 meters, as opposed to a lower power mode that may work only up to 20 meters.

Thus, if a user was approaching the other mobile moving at a rate of 1.5 meters per second, the 100 meter range would still provide sufficient time for authentication and to negotiate ranging parameters, as well as send a ranging start message. Such extra time to establish communication can be advantageous when there can be interference from other devices, which might otherwise delay detection of the mobile device and start of ranging.

But, these packets can be roughly 2 to 8 times longer duration, e.g., up to about 16 milliseconds, which does not make them suitable for ranging. A one microsecond pulse provides a range that is +/−300 meters. And, even regular power modes for BT provide pulses that are not suitable for ranging.

B. Sequence Diagram

Figure 4:
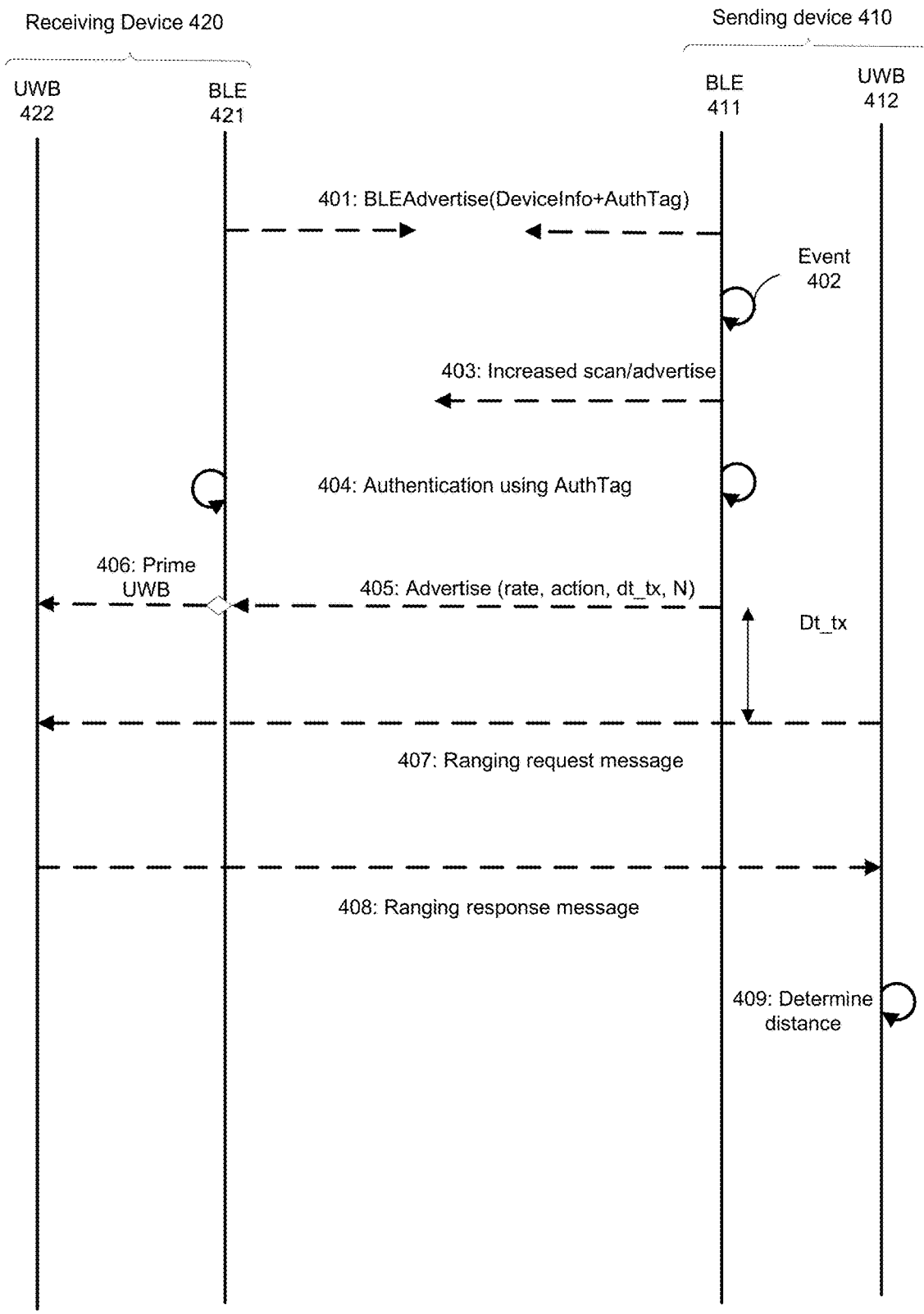
FIG. 4 shows a sequence diagram of communications between a sending device and a receiving device involving BLE and UWB protocols according to embodiments of the present disclosure.

FIG. 4 shows a sequence diagram of communications between a sending device 410 and a receiving device 420 involving BT and UWB protocols according to embodiments of the present disclosure. The mobile devices can be in a screen off state or be actively in use by a user. Certain steps of the sequence diagram may be optional.

At 401, a BLE antenna 411 of sending device 410 transmits an advertisement signal, and BLE antenna 421 transmits an advertisement signal. The devices can broadcast advertisement signals at a specified duty cycle, without the user having to provide any user input. As shown, the advertisement signal includes device information and an authentication tag. The device information can correspond to information about the device, such as type of device (e.g., a watch, a tablet, or a phone), a state of the device (e.g., whether unlocked or orientation, such as on a wrist or in a pocket), and a version of a protocol or other software. The devices can also scan at some duty cycle. Authentication can occur as part of 401.

Each device registered with an authentication server can have a unique authentication tag. In various embodiments, the authentication tag can involve use of public keys, certificates, and digital signatures. For example, a device can store the public keys of someone in their contact list, and can authenticate a digital signature from a sending device using the public key. In other embodiments, a shared cryptographic key can be used for encryption and decryption (or generation and verification of a digital signature) as opposed to using the asymmetric public and private keys.

At 402, an event is detected at sending device 410. As an example, the event could be a user input, e.g., an indication of an intent to share data. As another example, the event could be a detection of an advertisement from a receiving device that is being tracked by the sending device, e.g., to provide a reminder to the user of the sending device. Further details about such examples are provided later.

At 403, a BLE antenna 411 transmits and scans at a higher duty cycle. The increased advertisement and scanning can be part of a discovery process for the two devices to detect each other, so that a connection can be created. For example, if sending device 410 detects input that a ranging operation has been requested or is likely to be requested, the increased advertisement/scan can provide quicker establishment of a communications session using the first wireless protocol.

At 404, sending device 410 and receiving device 420 authenticate the other device using an authorization tag. The authentications by the two devices can occur at different times or a same or similar time. The authentication by may occur after later steps, e.g., after transmitting of an advertisement with ranging settings (405) and ranging request messages (407) has begun. At this point, a BLE connection can be considered as created between the two devices.

In some embodiments, as part of establishing a BLE connection, each device can obtain keys for performing encrypted (secure) communications. If a connection was previously made, keys could be re-used. The authentication tag can be used to retrieve stored key(s) for performing the encryption/decryption of future BLE messages.

At 405, BLE antenna 411 transmits an advertisement signal that includes an action command (e.g., that ranging is being requested) and one or more ranging settings. The advertisement can also include an authentication tag. As shown, the ranging settings include rate, dt_tx, and N. The rate can specify a time (e.g., 300 ms for a default transmit/scan rate or 30 ms for an increased transmit/scan) and N can specify a multiple, thereby providing a time delay between each ranging request message. The time offset dt_tx specifies a time after an advertisement signal that the ranging request message is sent. In this manner, receiving device 420 knows when UWB antenna 422 should be turned on. Such an advertisement signal can be sent after authentication has been performed by sending device 410, and potentially after receiving device 420 acknowledges having performed its authentication. In some embodiments, an action command in the advertisement can cause a processor of the receiving device 420 to wake up, or at least for the UWB circuitry (or other circuitry of a first wireless protocol) to be initialized.

The advertisement in 405 can be considered part of a ranging setup handshake. In some embodiments, receiving device 420 can send a message to sending device 410 acknowledging receipt of the ranging settings, or potentially proposing a change to the settings. The ranging setup handshake can include the ranging capabilities of the two devices. Information about the UWB antennas can be provided as different devices can have different numbers of UWB antennas, or a device may want to only turn on a few. A coarse ranging may occur at first, with finer ranging using more UWB receivers occurring after the mobile devices are closer. Other settings/parameters may be provided between ranging operations, e.g., as part of a dynamic decision or updating of software or physical components.

Other examples for ranging capabilities include a number of antennas, location of those antennas (e.g., a relative distances between the antennas), how many antennas to use, encryption protocols, packet format, modes of operation, and supported frequency range. Such capabilities may reflect a software update of either device, resulting in a new or different capability. The ranging setup handshake can include a negotiation about how to carry out the ranging, such as how often to range or how to schedule the ranging (e.g., when there are multiple receiving devices—round robin, one at a time, or other options). A sending device may know it is connected to three different devices, and thus the mobile device may want a lower rate of range measurements to each device (e.g., 25 milliseconds) or schedule a particular time/frequency to perform ranging with each device. A duty cycle for when the UWB radios are on can be specified, e.g., 1 KHz or 10 KHz. For instance, when a start message is received, the devices can agree to start ranging 100 milliseconds (or 90 milliseconds for extra margin) from advertisement at 405 and then every 1 KHz after that.

The ranging setup handshake can also manage encryption of the UWB messages, e.g., by deriving a new set of sessions keys for UWB ranging. The keys can be updated periodically, e.g., for each session or every Nth session. In some embodiments, the session keys can be derived from a common shared secret that was used in a challenge-response for authentication, where the derivation uses default or negotiated procedures. Accordingly, the ranging setup handshake can act as a control channel to inform the receiving device about what to expect for the ranging. The ranging setup handshake messages can specify a destination address so as not to cause confusion with any other nearby devices.

At 406, receiving device 420 initiates actions to turn on a UWB antenna 422, or multiple UWB antennas. Such initial steps can prime some circuitry so that UWB antenna 422 is in a ready state, but potentially not fully turned on. This may be the first time that receiving device 420 was able decode an advertisement signal with the ranging settings. Such decoding may occur after receiving device 420 was able to authenticate sending device 410 by a previous advertisement signal.

At 407, sending device 410 sends a ranging request message using UWB antenna 412. The ranging request message is sent dt_tx milliseconds after the advertisement signal in 405. Receiving device 420 knows this timing offset, and thus can turn on UWB antenna 422 within a time window after having detected the advertisement in 405. Other ranging request messages may have been sent previously while not being detected by receiving device 420. For ease of illustration, only one ranging request message is shown. Other advertisements may also be sent before 405, but were not detected by receiving device 420. The ranging request message can specify a destination address of receiving device 420, which can allow other nearby devices to the ranging request message.

At 408, receiving device 420 sends ranging response message using UWB antenna 422. The ranging response message may include times as described for FIGS. 1 and 2.

At 409, sending device 410 determines distance information using times when the ranging request message was sent, times in the ranging response message, and when the ranging response message was received. Examples techniques for determining the distance information are described herein, e.g., for FIGS. 1 and 2.

In some embodiments, a frequency correction can be determined. For example, a frequency offset of the receiving oscillator (clock) with respect to the sending oscillator can allow a determination of distance within a fairly accurate range, e.g., down about 20, 30, or 40 cm. As to using a frequency offset, the sending device can broadcast that its clock is running at a particular rate, e.g., on a particular channel, such as 5 or 9. A resulting frequency error can be used to correct a relative clock drift rate between the clocks, which can improve the accuracy. Other formulations can use an additional messages to further improve the accuracy of the ranging measurement, e.g., as described in U.S. Patent Publication 2019/0135229, which incorporated in its entirety for all purposes.

Further ranging can be performed. For example, more than one distance can be determined, which can be used to determine a trajectory, determine greater accuracy, or confirm that the two devices are within a stable proximity to each other (e.g., to estimate that the two users are interacting with each, as may occur during a meeting or a conversation). Such information about a stable proximity can be used to trigger a reminder.

C. Example Ranging Protocol

An example format for a ranging service message format can provide a code (e.g., one octet long) that indicates the type of the message. The length field (e.g., two octets long) can indicate the size in octets of the data field of the message, which may not include the code and length fields. The data field can be variable in length. Thus, the code field can determines the format of the data field and the length field can indicate the length of the data field.

The ranging setup (capability) handshake can be initiated at the start of every connection to exchange state of UWB devices on the mobile devices. The ranging capability request message can have a particular ID code (e.g., 1). Some example parameters for this message include supported features mask, required features mask, software version, link identifier, number of UWB radio devices, and a UWB device descriptor.

The software version parameter can indicate the current ranging software version running on the initiator device. The link identifier can be a random number that allows the responder to match the received UWB packets to the BT connection with the initiator. Thus, the link identifier can be included in UWB messages.

The mobile devices can maintain two features masks: a supported features mask and required features mask. The supported features mask can indicates supported features. The features mask parameter can be a bit mask of all features. For each feature, a single bit can be specified, e.g., set to 1 if the feature is supported and set to 0 otherwise. Example features are secure ranging, 1-1 ranging (e.g., 1 device to 1 device), and 1-many ranging. The required features mask can indicate required features. For example, support for secure ranging and 1:1 ranging can be mandatory.

The UWB device descriptor can have one entry for each available UWB antenna device (e.g., antenna or node with more than one antenna). A features request message can have one UWB device descriptor entry for each UWB device on the initiating device. Each of the UWB antenna devices can be characterized by a UWB device descriptor with the following parameters: firmware version—version of current UWB firmware; hardware version—version of current UWB hardware; manufacturer name—name of UWB manufacturer. The number of UWB devices available can be specific to a particular ranging session. The link identifier can map a BT link to UWB packets.

The ranging capability response message can be similar to the ranging capability request message. The responder may be designated for sending this message. If the responder does not support any feature listed in the required features of the ranging capability request message, the responder can respond with an additional ranging command complete message with an unsupported feature error code. The ranging capability response message can includes the parameters: supported features, software version, number of UWB devices, and UWB device descriptor.

III. Mobile Device for Performing Ranging

Figure 5:
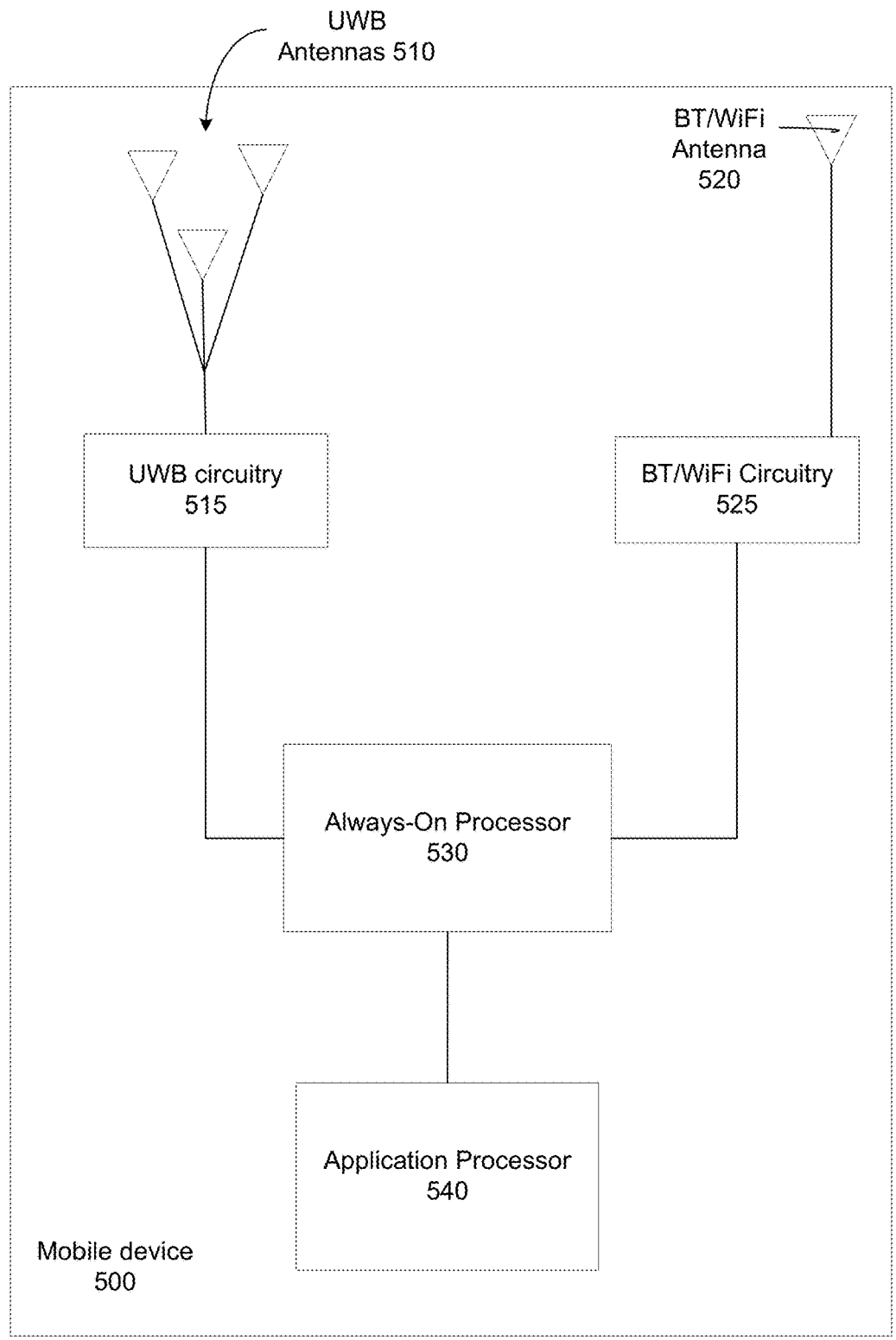
FIG. 5 is a block diagram of components of a mobile device operable to perform ranging according to embodiments of the present disclosure.

FIG. 5 is a block diagram of components of a mobile device 500 operable to perform ranging according to embodiments of the present disclosure. Mobile device 500 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 500 includes UWB antennas 510 for performing ranging. UWB antennas 510 are connected to UWB circuitry 515 for analyzing detected signals from UWB antennas 510. In some embodiments, mobile device 500 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 515 can communicate with an always-on processor (AOP) 530, which can perform further processing using information from UWB messages. For example, AOP 530 can perform the ranging calculations using timing data provided by UWB circuitry 515. AOP 530 and other circuits of the device can include dedicated circuitry and/or configurable circuitry, e.g., via firmware or other software.

As shown, mobile device 500 also includes BT/WiFi antenna 520 for communicating data with other devices. BT/WiFi antenna 520 is connected to BT/WiFi circuitry 525 for analyzing detected signals from BT/WiFi antenna 520. For example, BT/WiFi circuitry 525 can parse messages to obtain data (e.g., an authentication tag), which can be sent on to AOP 530. In some embodiments, AOP 530 can perform authentication using an authentication tag. Thus, AOP 530 can store or retrieve a list of authentication tags for which to compare a received tag against, as part of an authentication process. In some implementations, such functionality could be achieved by BT/WiFi circuitry 525.

In other embodiments, UWB circuitry 515 and BT/WiFi circuitry 525 can alternatively or in addition be connected to application processor 540, which can perform similar functionality as AOP 530. Application processor 540 typically requires more power than AOP 530, and thus power can be saved by AOP 530 handling certain functionality, so that application processor 540 can remain in a sleep state, e.g., an off state. As an example, application processor 540 can be used for communicating audio or video using BT/WiFi, while AOP 530 can coordinate transmission of such content and communication between UWB circuitry 515 and BT/WiFi circuitry 525. For instance, AOP 530 can coordinate timing of UWB messages relative to BT advertisements.

Coordination by AOP 530 can have various benefits. For example, a first user of a sending device may want share content with another user, and thus ranging may be desired with a receiving device of this other user. But if many people are in the same room, the sending device may need to distinguish a particular device among the multiple devices in the room, and potentially determine which device the sending device is pointing to. Such functionality can be provided by AOP 530. Also, it is not desirable to wake up the application processor of every other device in the room, and thus the AOPs of the other devices can perform some processing of the messages and determine that the destination address is for a different device.

To perform ranging, BT/WiFi circuitry 525 can analyze an advertisement signal from another device to determine that the other device wants to perform ranging, e.g., as part of a process for sharing content. BT/WiFi circuitry 525 can communicate this notification to AOP 530, which can schedule UWB circuitry 515 to be ready to detect UWB messages from the other device.

For the device initiating ranging, its AOP can perform the ranging calculations. Further, the AOP can monitor changes in distance between the other device. For example, AOP 530 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

IV. Sharing Data Based on Range

A user of one mobile device may want to share data (e.g., a video or audio file) to another user. The user could attach a file to an email and send, but this can be slow and expose the data to a network. Thus, it may be advantageous to send the data directly to the other device, e.g., using Bluetooth or WiFi direct (also called peer mode or ad-hoc mode), or at least only through a local access point/router. For example, the user's device can detect other nearby devices and display them as options for sharing the data.

Sharing data in this manner can be problematic when there are multiple devices nearby. For example, if two people (i.e., sender and receiver) are in a crowd, the discovery process can identify multiple devices. If multiple devices are displayed as options, their icons can be difficult to display on a single screen, thereby causing frustration to a user, who wants to select a friend's device quickly. It is possible to only display icons of other devices that show up in a contact list of the sending device. This can limit the number of devices shown as options for sending the data. But, such a requirement can limit the ability to share data to a new person. And, the requirement of being in the contact list does not address when a user is among many friends, coworkers, etc., where all or many of them are in the contact list. Embodiments can use ranging to facilitate this process.

A. Example Sharing Scenario

Figure 6:
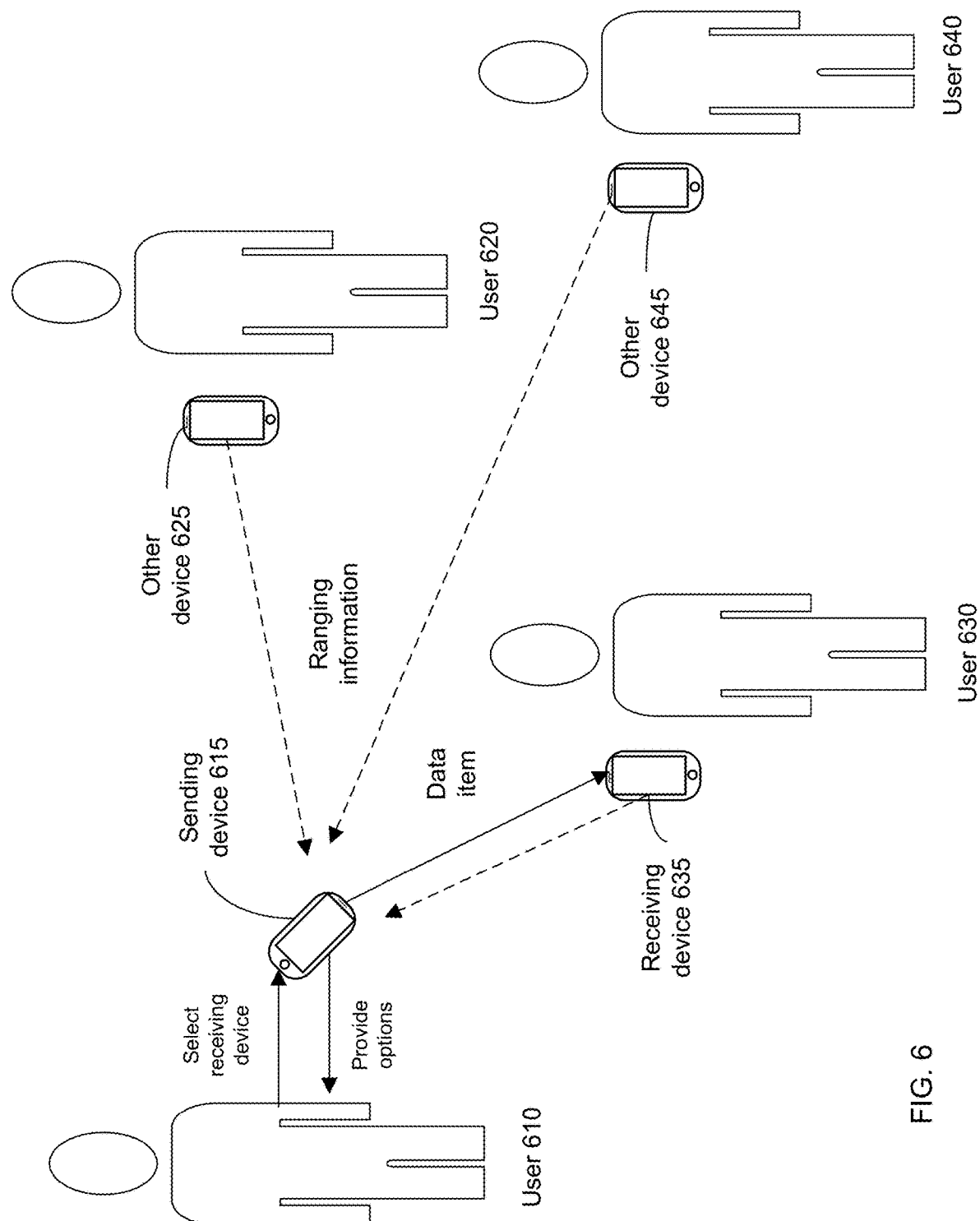
FIG. 6 shows an example sharing scenario of a mobile device using ranging to facilitate sharing a data item with another device according to embodiments of the present disclosure.

FIG. 6 shows an example sharing scenario of a mobile device using ranging to facilitate sharing a data item with another device according to embodiments of the present disclosure. The data item could be various things, e.g., a contact, an audio file, an image, a video file, a deep link to a location in an application installed on both devices, and the like. A sharing session can be initiated by user 610 using a sending device 615.

A user 610 can initiate the sharing session on sending device 615 in a variety of ways. For example, user 610 can select a data item, and then select a sharing option (e.g., a button on a GUI) to share the data item. The selection of the sharing option can begin a sharing process, e.g., as described in FIGS. 1-4.

Advertisements can be sent from the devices and used for authentication. Sending device 615 can authenticate each of devices 625, 635, and 645. Once authenticated, sending device 615 can perform a ranging operation with each of the devices, which can respond with ranging information, as depicted.

Sending device 615 can use the range information to determine distance information, e.g., relative positions of the other devices. For example, if the sending device 615 includes multiple antennas (e.g., 3), sending device 615 can determine a position of each of the devices on a 2D grid relative to sending device 615. As another example, sending device 615 can determine a single distance value to each of the devices, where devices may be sorted in a list by this distance. Sending device 615 can use the distance information for configuring a display on a screen of sending device 615. For instance, the position can be used to determine where to display an icon corresponding to mobile device 220, e.g., which position in a list, which position in a 2D grid, or in which cluster of 1D, 2D, or 3D distance/position ranges to display the icon.

User 610 can select which device to send the data item. As shown, device 635 is selected. The selection can be made in various ways, e.g., by touching an icon representing receiving device 635, which can be a picture of user 630. In other embodiments, user 610 can point sending device 615 at receiving device 635 to achieve the selection. For instance, the device that is along a central axis pointing from the sending device can be automatically selected as the recipient of the data item. In this manner, user 610 can easily see available devices and select the desired device.

In some embodiments, the users can control which other devices can discover them and perform ranging, or whether the device will allow sharing. For example, a user can restrict such operations to those in the contact list or a subset of those in the contact list. And, as described herein, the authentication can occur without providing private information in the clear, e.g., any such private data may be encrypted or otherwise obfuscated. For example, hashes of identifiers can be used as an first authentication tag, or public certificates and/or digital signatures can be used. For instance, an authentication server can issue the hashes, digital signatures, public certificates, etc., so that a device can match an authentication tag to a device that has been previously encountered (e.g., in a contact list) or at least know that the device has been registered and/or authenticated by the authentication server. The authentication server can provide authentication tags for each device in a contact list. As another example, such authentication tags (e.g., hashes) can be generated by a first device (e.g., at time of registration) and sent to the authentication server, which can distribute them to other devices that have the first device or related identifier in their contact list.

B. Method for Sharing Content

Figure 7:
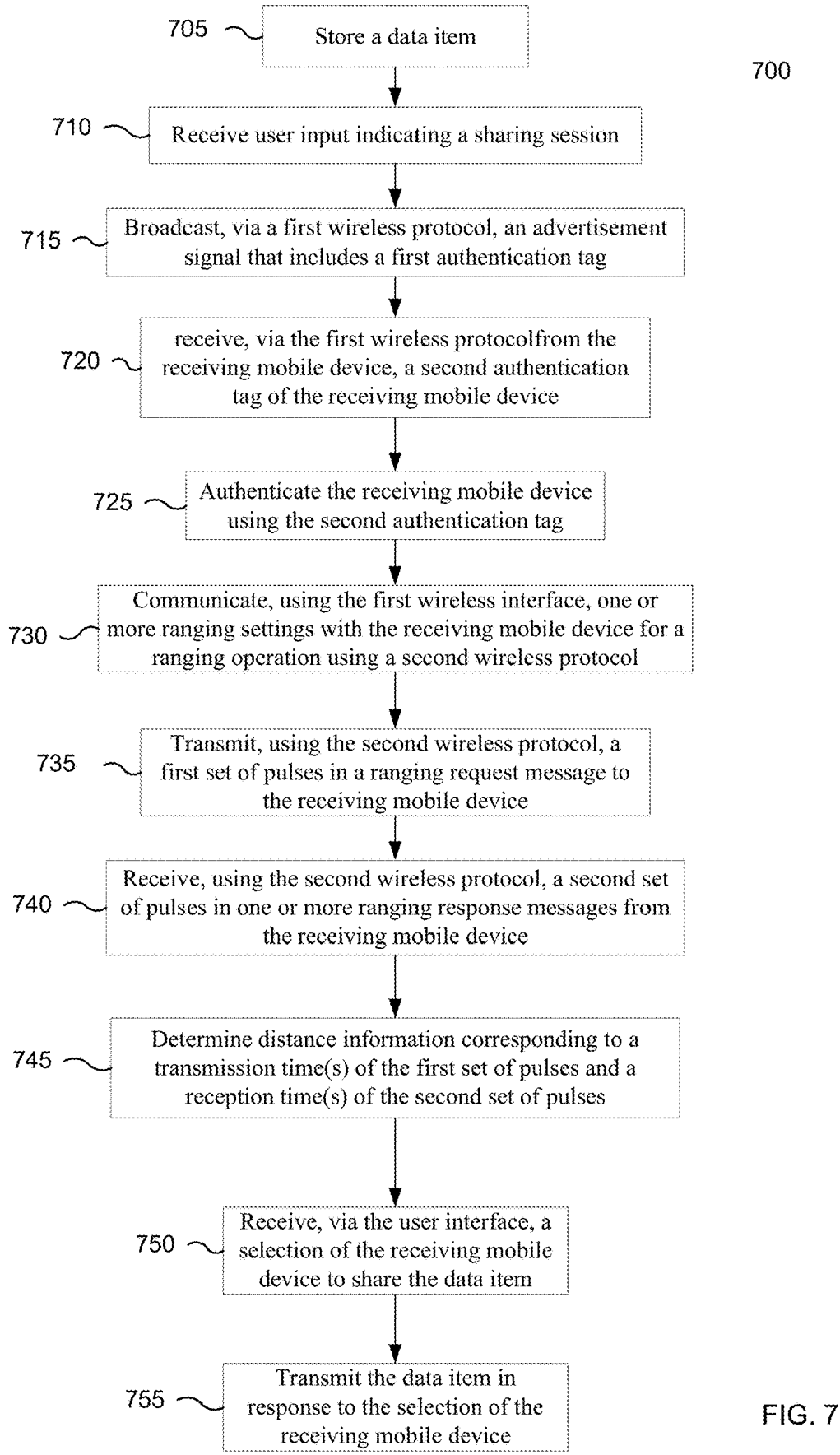
FIG. 7 is a flowchart of a method 700 of sharing data between a sending mobile device and a receiving mobile device according to embodiments of the present disclosure.

FIG. 7 is a flowchart of a method 700 of sharing data between a sending mobile device and a receiving mobile device according to embodiments of the present disclosure. Method 700 can be used to determine a spatial relationship of other devices to the sending mobile device, and use that spatial relationship to facilitate a user in selecting one or more devices to share a data item. Method 700 can be performed by any device that acts as a sending device.

At block 705, the sending mobile device stores a data item in a memory. The data item can be of any type, some examples of which are provided herein. For example, the data item may be a photo or other image stored in any suitable file format, video, or a text file (e.g., contact information, a link to a webpage, a link to an application, a GPS coordinate, etc.). The data item can be stored in various locations of the memory, e.g., RAM, flash memory, a hard drive, and the like.

At block 710, a user interface of the sending mobile device receives user input indicating a sharing session. The user input can be varied. For example, the user can select a share button on a screen corresponding to the data item. As another example, a user can provide a voice command, such as "share item" or "send item." The user interface can take various forms, e.g., icons corresponding to different users can be placed on different locations on a screen. These locations can vary depending on the relative position of the receiving mobile device to the sending mobile device, e.g., relative to a pointing direction of the sending mobile device. For instance, the location could be shown at points around a circle corresponding to the sending mobile device.

At block 715, the sending mobile device transmits (e.g., broadcasts), via a first wireless protocol, an advertisement signal that includes a first authentication tag of the sending mobile device. The sending mobile device may initiate communication or the receiving mobile device may initiate communication. Thus, the advertisement signal sent by the sending mobile device can be in response to a signal (message) from the receiving mobile device. For example, the sending mobile device can detect neighboring devices, store their information (e.g., contact information), and then transmit the first authentication tag after the user input indicates a sharing session. Examples of an authentication tag are provided herein, e.g., unique identifier, hash, shared secret, digital signature, public certificate, or a cryptographic key, such as a public key or a shared key used by both devices. Examples of a first wireless protocol include Bluetooth and Wi-Fi.

At block 720, a second authentication tag of the receiving mobile device is received from the receiving mobile device via the first wireless protocol. The second authentication tag can be of a similar type as the first authentication tag, but can be different. The second authentication tag may be received in response to the advertisement signal sent at block 715. In another implementation, the second authentication tag is received before block 715, e.g., as described above. Example techniques for authentication are also described in relation to FIGS. 3 and 4.

At block 725, the second authentication tag is used to authenticate the receiving mobile device. Similarly, the receiving mobile device can use the first authentication tag to authenticate the sending mobile device. The authentication process can be performed in various ways. For example, an authentication tag can be a digital signature of a portion of a payload, which can be received with the authentication tag. Then, a public key can be used to decrypt the digital signature to match to the payload. As another example, a device can store authentication tags in association with user/device identifiers (which may be included in the payload of a message), and the received authentication tag can be compared to a stored authentication tag corresponding to the received user/device identifier. Other examples of authentication are provided herein.

At block 730, the first wireless protocol is used to communicate one or more ranging settings with the receiving mobile device for a ranging operation to be performed using a second wireless protocol. Example ranging settings can include an indicator that ranging is to be performed, rate (e.g., a transmission rate) of a ranging signal and/or request message, a time offset, a delay between a ranging signal and a ranging request message, and a multiple used for a time delay. An example second wireless protocol is UWB. Such ranging settings can be specified by a template number, e.g., specifying an ID number for an indexed set of ranging settings that are already stored at the other device. Once the ranging settings are received, a ranging operation can be performed.

At block 735, the second wireless protocol is used to transmit a first set of one or more pulses in a ranging request message to the receiving mobile device in accordance with the one or more ranging settings. As examples, the ranging operation can be performed as described in FIGS. 1-4. The second wireless protocol can use a pulse width that is less than a pulse width used by the first wireless protocol, e.g., UWB may be used.

At block 740, the sending mobile device receives, using the second wireless protocol, a second set of one or more pulses in one or more ranging response messages from the receiving mobile device. The second set of pulse(s) can corresponding to the ranging responses in FIGS. 1, 2, and 4 and corresponding description. The response messages can include information, e.g., any timing information, such as a reception time of the first set of pulse(s) and a transmission time of the second set of pulse(s), which may be provided as a delay time.

At block 745, distance information corresponding to one or more transmission times of the first set of one or more pulses and one or more reception times of the second set of one or more pulses is determined. The distance information can have various units, such as distance units (e.g., meters) or as a time (e.g., milliseconds), as is described herein. The distance information can include radial and angular information, e.g., by using triangulation.

At block 750, the sending mobile device receives, via the user interface, a selection of the receiving mobile device to share the data item. The user interface can include various modes, e.g., an audio interference, a gesture interface, a touch interface, etc. The selection can be made in accordance with the distance information. For example, the selection of the receiving mobile device can be determined based on an orientation of the sending mobile device and the receiving mobile device, as determined using the distance information. Such an orientation can be determined from a 2D or 3D relative position of two devices, which may be determined using measurements from multiple antennas.

In another example, a screen of the sending device can display an icon corresponding to the receiving mobile device. The icon can be displayed at a location on the screen based on the distance information. For instance, the location can be used to determine where to display an icon corresponding to mobile device 220. The location can be an order in a list, e.g., sorted by distance. The location can be on a 2D grid, e.g., with a lateral position determined using the timings from multiple antennas. As another example, the locations of different devices can be clustered, e.g., based on a one-dimensional distance value (similar to a list but with a group of devices in a range) or 2D/3D position ranges to display the icon. The selection of the receiving mobile device can be received at the icon on the screen, e.g., by a user tapping an icon.

In some implementations, the icon can be displayed at the location on the screen by comparing a distance of the distance information to a threshold and displaying the icon when the distance is less than the threshold. In this manner, only devices that a sufficiently close can be displayed. Such a threshold can be user-defined or a default. The threshold can depend on other settings, e.g., in a contact list of the sending device.

In other implementations, the icon can be displayed at the location on the screen by determining a physical position (e.g., 2D or 3D position) of the receiving mobile device relative to the sending mobile device using the distance information. Thus, the physical position can be displayed on a grid, e.g., a pixel grid, based on coordinates of the physical position. Accordingly, the location can correspond to a two-dimensional coordinate on the screen. In another example, the location can be selected from a set of locations, e.g., predetermined positions in a list or clusters that are preassigned or already determined. Accordingly, the physical position can include a distance, where the location is a position in a list of a plurality of mobile devices, each of which has an associated distance. The list can be sorted by distance.

At block 760, the data item is transmitted in response to the selection of the receiving mobile device. The data item can be transmitted via a third wireless protocol or the first wireless protocol. As examples, the first wireless protocol can be Bluetooth low energy, the second wireless protocol can be ultra-wide band (UWB), and the data items can be transmitted using Wi-Fi. The transmission of the data item can be responsive to other actions as well. For example, a user may identify the receiving mobile device before specifying the data item. Thus, the data item can be sent once the data item is selected, while still being responsive to the selection of the receiving mobile device.

C. Encrypted Ranging and Sharing

There can be one or more higher levels of security, e.g., as dictated by the type of data being shared. For instance, sharing information about a person (e.g., phone number or address of a contact in a mobile device) may warrant a higher level of security. An encrypted ranging session between the two devices can confirm that the two devices are close. A shared secret can be used for cross-correlation to get the proper information (e.g., same wave forms) from the ranging messages.

Using encryption keys can be difficult when the devices have not communicated before. To establish a secure connection between two new devices can use a Diffie-Hellman key exchange (e.g., as in TLS, Transport Layer Security), but such a process can require network access and be time consuming, and not be suitable for use with UWB. Instead, a pin code can be provided by one device and input at the other device. Such a pin code could be in text, embedded in audio, or in an image or video output by one device and captured by the other device. But, such an extra step can be bothersome to a user.

Some embodiments can use an identifier stored in circuitry, e.g., in the UWB circuitry. Thus, a chip can be associated with a particular mobile device. Server-side certificates can be shard or stored on a device. The BLE communication can use the certificates to determine that the device has been authenticated by an server. Then, if the ranging confirms the devices are close, data can be shared, e.g., using encryption techniques, such as public key encryption or Diffie-Hellman.

V. Communication Sequence for Sharing Content

The sharing of content can use three different wireless protocols, e.g., as described above. The first wireless protocol (e.g., BLE) can be used for authentication and sharing of ranging settings. The second wireless protocol (e.g., UWB) can be used for performing ranging operations to obtain distance information from a sending mobile device to other mobile devices. A third wireless protocol (e.g., Wi-Fi or Bluetooth) can be used to transmit a data item from a sending mobile device to a receiving mobile device, which has been selected to receive the data item. Some embodiments can coordinate circuitry for each of these wireless protocols. Further, circuitry can operate in response to other actions, e.g., user actions to initiate a sharing session.

Figure 8:
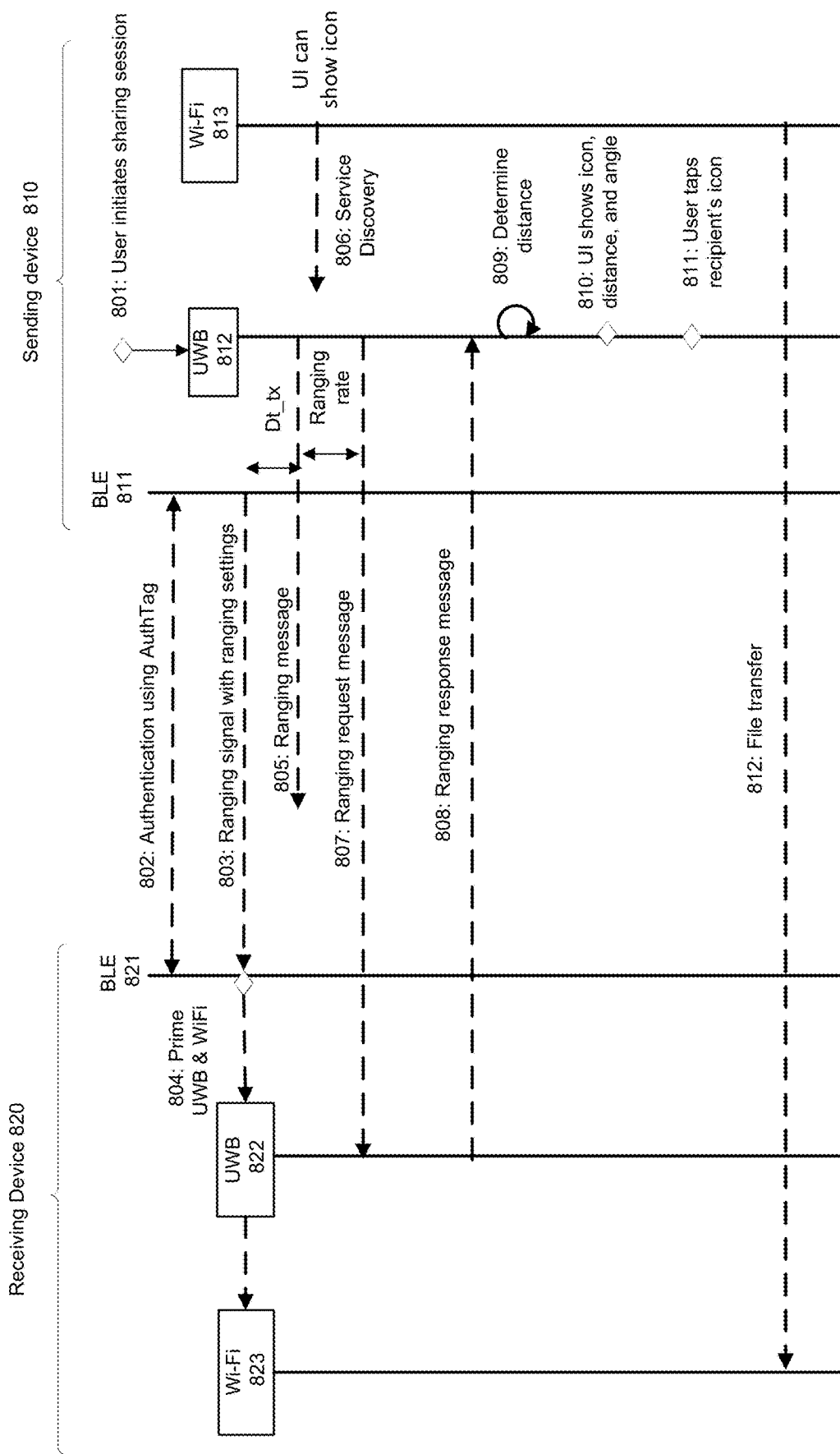
FIG. 8 is a sequence diagram showing an example communication sequence to share content using three wireless protocols according to embodiments of the present disclosure.

FIG. 8 is a sequence diagram showing an example communication sequence to share content using three wireless protocols according to embodiments of the present disclosure. Aspects of the sequence diagram in FIG. 8 can be performed in a similar manner as the sequence diagram in FIG. 4. The communication involves a sending device 810 and a receiving device 820. These devices can always be advertising and scanning (potentially at different rates) using a first wireless protocol, e.g., BLE. The duty cycles for such advertising and scanning can vary depending on the state of the devices, e.g., whether they are actively being used, which can be equated to having a backlight on.

Sending device 810 includes BLE circuitry 811, UWB circuitry 812, and Wi-Fi circuitry 813. Receiving device 820 includes BLE circuitry 821, UWB circuitry 822, and Wi-Fi circuitry 823. Communication among the different circuitry of a device can be coordinated by a processor, e.g., one or more processors in FIG. 5, such as AOP 530.

At 801, a user initiates a sharing session on sending device 810. Example ways to initiate a sharing session are described herein, e.g., by selecting an option displayed for a data item. In response to the initiation, services of communication circuitry of sending device 810 can be launched. For example, BLE, UWB, and Wi-Fi services can be launched or changed. For BLE, a higher scan rate can be used. The increased rate can provide quick discovery, e.g., when someone walks into a room. UWB circuitry 812 and Wi-Fi circuitry 813 could be in any previous state, e.g., off, idle, or active.

At 802, the two devices authenticate each other using authentication tags provided in advertisement signals transmitted and scanned by the two devices. Example techniques for this authentication are described in relation to FIGS. 3 and 4.

At 803, a ranging signal is transmitted by BLE circuitry 811 to inform receiving device 820 about a desire to perform a ranging operation or that a sharing mode is to be entered, which can also include performing a ranging operation. The BLE ranging signal can be similar to the advertisement described at 405 of FIG. 4 and may include scheduling (timing) information between BLE and UWB signals or other ranging settings. Thus, the BLE ranging signal can include a transmission rate of the ranging signal (e.g., X ms), a transmission rate of ranging request messages (e.g., N*X ms), an indicator that ranging is to be performed (e.g., by including a particular flag/command that indicates a ranging action), and a delay between a BLE ranging signal and a UWB ranging request message (e.g., Dt_tx). N can be the number of BLE intervals before transmitting a ranging message, specifying a ratio to the BLE advertisement rate.

At 804, the action indicated in the ranging signal causes UWB circuitry 822 to wake up. Wi-Fi circuitry 823 can also make up in response. The action (also called a nearby action) can have a flag set to 'true' for waking up the circuitry. Further, UWB circuitry 822 can scan at an expected arrival time, e.g., t_arrival=t_rx_BLE+dt_tx (+/−margin). Further, in response to the ranging signal, Wi-Fi circuitry 823 can launch a discovery process, e.g., Neighbor Awareness Networking (NAN). Such a priming of Wi-Fi circuitry 823 can be performed when the ranging signal indicates that a sharing mode is desired by sending device 810. With reference to FIG. 5, application processor 540 can be turned on when the other device is authenticated, and application processor 540 can turn on Wi-Fi circuitry 823. In some embodiments, Wi-Fi circuitry can be used to get identity from the other devices that are not in a contact list.

At 805, UWB circuitry 812 transmits a ranging request message after a delay of Dt_tx ms relative to the BLE ranging signal. This ranging request message is not detected by UWB circuitry 822, e.g., because it has not been fully powered on yet due to a ranging signal not being detected yet or having just been detected.

At 806, Wi-Fi circuitry 813 transmits a service discovery signal, e.g., using NAN. Once the two Wi-Fi circuitries establish a connection, a user interface (e.g., a GUI on a display screen) can show an icon corresponding to receiving device 820.

At 807, UWB circuitry 812 transmits another ranging request message. This ranging request message is detected by UWB circuitry 822. The ranging request messages can be similar as described for FIGS. 1-4.

At 808, UWB circuitry 822 transmits a ranging response message. The ranging response messages can be similar as described for FIGS. 1-4. The ranging can be non-secure or encrypted, where encryption can be used on a case by case basis. The ranging request messages can be sent as a multicast with no destination address specified. But, a ranging request message can specify a source address, which can be matched against a source address determined from the BLE communication (e.g., as matched using AOP 530 of FIG. 5). The receiving device can tie the addresses in different messages together across BLE and UWB, so that the proper destination address can be used. And, UWB circuitry 822 or other circuitry can recognize that a request message requires a response if it has a source address corresponding to a current ranging operation.

When using multicast to communicate with multiple devices, the other devices can select random slots in the frames of the response message to reduce collisions. Otherwise, the sending device might receive response messages from multiple devices all at the same, e.g., if they all chose the same slot. The total number of slots in a frame can be specified using the first wireless protocol, e.g., at 803, or in another communications suing the first or second wireless protocol, so that a random slot can be selected without fear of exceeding the total. In other embodiments, devices can be scheduled for certain time slots. For example, a first device that responds via BLE (or other first wireless protocol) or one that has a highest signal strength (e.g., RSSI) can be assigned to a first slot, and so on.

At 809, sending device 810 determines distance information using the ranging messages. The distance information can be determined as described herein.

At 810, a user interface of sending device 810 can display an icon corresponding to receiving device 820 along with the distance and potentially an angle, e.g., when multiple UWB antennas are used. In some embodiments, if sending device 810 is pointing directly at receiving device 820, an icon representing receiving device 820 (or equivalently a user of that device) can be displayed in the center of the screen of sending device 810. In other embodiments, a list of clustering of devices can be provided, where the clustering could differentiate an angular orientation between groups of devices or just differentiate by distance between groups of devices.

An icon for sending device 810 can be at a bottom of a screen, or some other markings can be used to indicate the device positions are relative to a particular point (e.g., bottom center) on the screen of sending device 810. Lines extending up and to the right and left (e.g., a radar-like view) can provide such an indication of the sending device. Available devices that do not have ranging capability can be shown in a default location on the screen.

At 811, a user of sending device 810 selects receiving device 820, e.g., by tapping the recipients icon, by an audio command, by pointing sending device 810 directly at receiving device 820, or by looking at a user (e.g., if a phone as facial imaging capabilities). The determination of the selection using an orientation of sending device 810 can be facilitated with a line down the center of the screen of sending device 810 so as to guide the user in pointing the device. By providing a relative position, a user can turn to the desired recipient (and thus their device), and that device will show up in a convenient location on the screen for the user to select.

At 812, the transfer of the data item (e.g., as a file) is performed using Wi-Fi circuitry 813. The data may be transmitted using other protocols, e.g., Bluetooth when the data to be transferred is relatively small. An indication of successful transmission can be provided by sending device 810.

The process of discovery (scanning and advertising) at a high rate and ranging can continue until the sharing session ends. For example, a user of sending device 810 can exit a sharing mode. Upon exiting, ranging can stop and the UWB circuitry can be put into a lower power state, e.g., off or asleep. The Wi-Fi circuitry can also be put into a reduced power state, e.g., off or in sleep.

VI. Notifications Using Ranging

Ranging operations can be used for other purposes besides sharing content. For example, a first device can provide a notification (e.g., a reminder) to a first user of the first device based on a distance to a designated (second) device. Such a reminder can be useful when a reminder relates to a second user of the second device. Thus, it would be convenient to receive the reminder when the first user is nearby (e.g., talking to) the second user. As another example, a notification may be desired when the distance is greater than a threshold, e.g., when the other device block to a child of a parent who is a user of a first device. The ranging capability can enable the first user to be reminded at an opportune time, where the first user might otherwise forget, e.g., to get back loaned money or an issue on a work project.

A. Example Reminder Based on Distance

Figure 9:
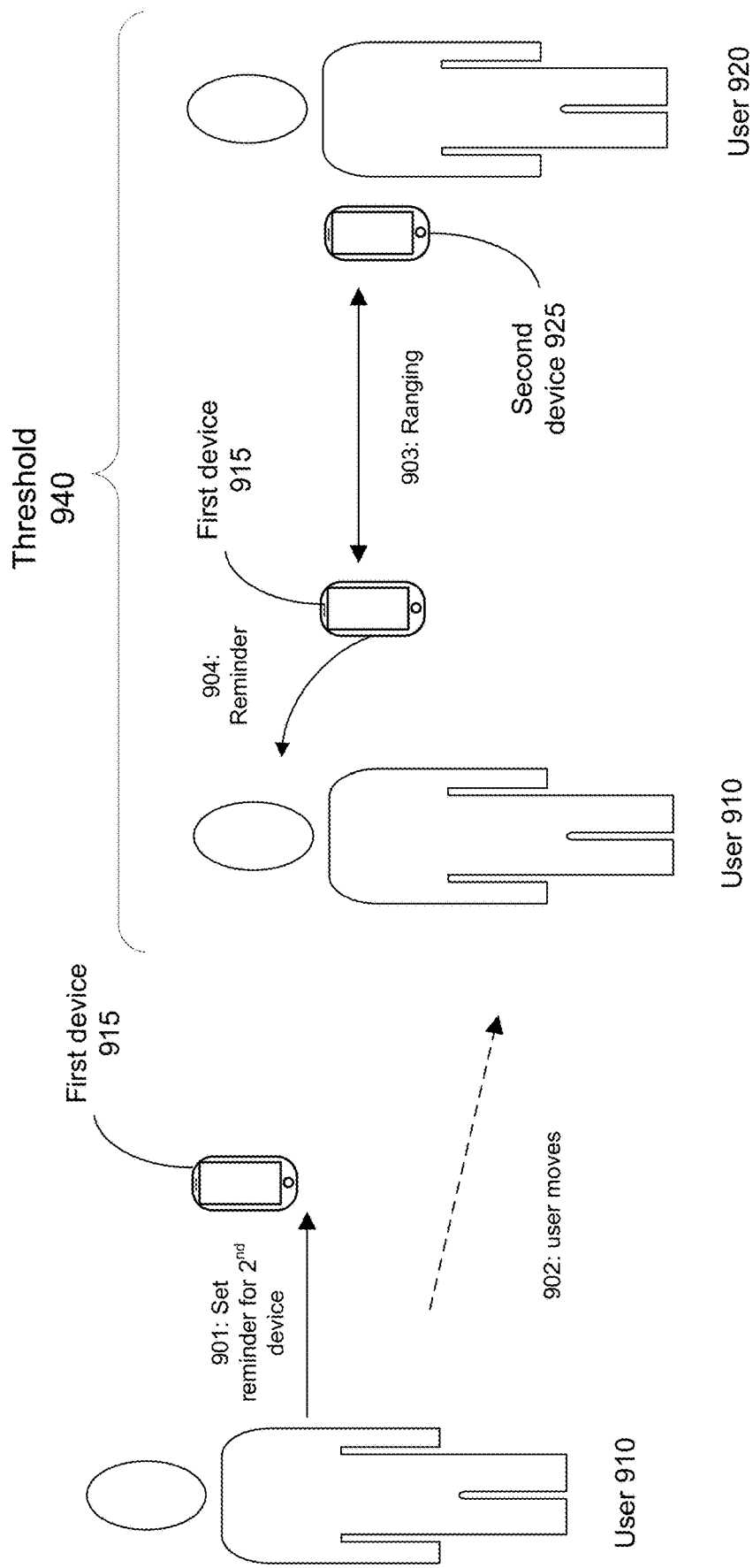
FIG. 9 shows an example notification for the first mobile device that uses ranging between the first mobile device and a second mobile device according to embodiments of the present disclosure.

FIG. 9 shows an example notification for the first mobile device that uses ranging between the first mobile device and a second mobile device according to embodiments of the present disclosure. A user can establish the notification, and then the reminder can be provided when the two mobile devices are close to each other (or too far from each other), as determined using ranging capabilities described above. Although FIG. 9 focuses on the notification being a reminder into devices are close, the description can apply similarly to instances when the notification is for two devices becoming separated.

At 901, a user 910 can configure a first device 915 to provide a reminder based on a proximity to a second device 925. At this time, first device 915 may or may not be within proximity to second device 925. For example, when a notification is to be provided for the two devices becoming separated, the two devices may be close to each other when the notification is setup. In some embodiments, approval from second device 925 is required to establish such a ranging notification. Second device 925 may also be able to revoke such approval.

At 902, user 910 moves to a second position that is possibly close to user 920, as may be determined via ranging between the two devices. Alternatively, user 920 may move. The ranging may begin without user 910 having to interact with first device 915. For example, ranging can begin when a device is in a pocket. The control of the ranging can be coordinated by a processor of first device 915, e.g., AOP 530 of FIG. 5. AOP 530 can detect the presence of second device 925, e.g., using BLE and authentication as described above. When the reminder was first established, first device 915 can confirm that an authentication tag of second device 925 is stored. Once authenticated, UWB circuitry can be turned on to begin the ranging operation. In some implementations, an advertisement/scan rate can be increased once authentication occurs, e.g., to establish a ranging settings as quickly as possible.

At 903, a ranging operation can be performed between first device 915 and second device 925. Distance information can be determined from the ranging, and a distance of the distance information can be compared to a threshold 940. In the example shown, if the distance is less than threshold 940, a reminder can be provided by first device 915 to user 910. Because the ranging operation is with a specific device (i.e., second device 925), the ranging request message can specify a destination address corresponding to second device 925. The ranging may be encrypted, e.g., as may be set by user 910 on a case-by-case basis. A shared secret may be establish when the notification is first created.

At 904, first device 915 provides the reminder. The reminder can be provided in various ways, e.g., the audio, haptic, or visual cues, or a combination of any two or more of these. For example, first device 915 may emit a buzz or ring, and a message can be displayed on the screen.

When configuring a reminder, user 910 can provide a message as well as a threshold criteria. Such threshold criteria can include a distance as well as a time interval, e.g., to enforce that the two devices are within a threshold for at least a specified time interval (e.g., 20 or 30 seconds). The specification of a time interval can increase reliability. For instance, if the two users work in a same building, one user may pass by another user's office or a meeting room that the other user is in, but such a scenario would not be a convenient time to provide the reminder. Thus, the reminder may not be provided immediately when the two users first get close to each other.

The example of getting an alert when the two devices become separated may apply when a parent's child has a mobile device (e.g., a watch or other wearable device). The parents device can receive an alert if the child wanders too far away. Such monitoring can be performed by an AOP, which can use less power than an application processor of the device.

B. Method for Notifications

Figure 10:
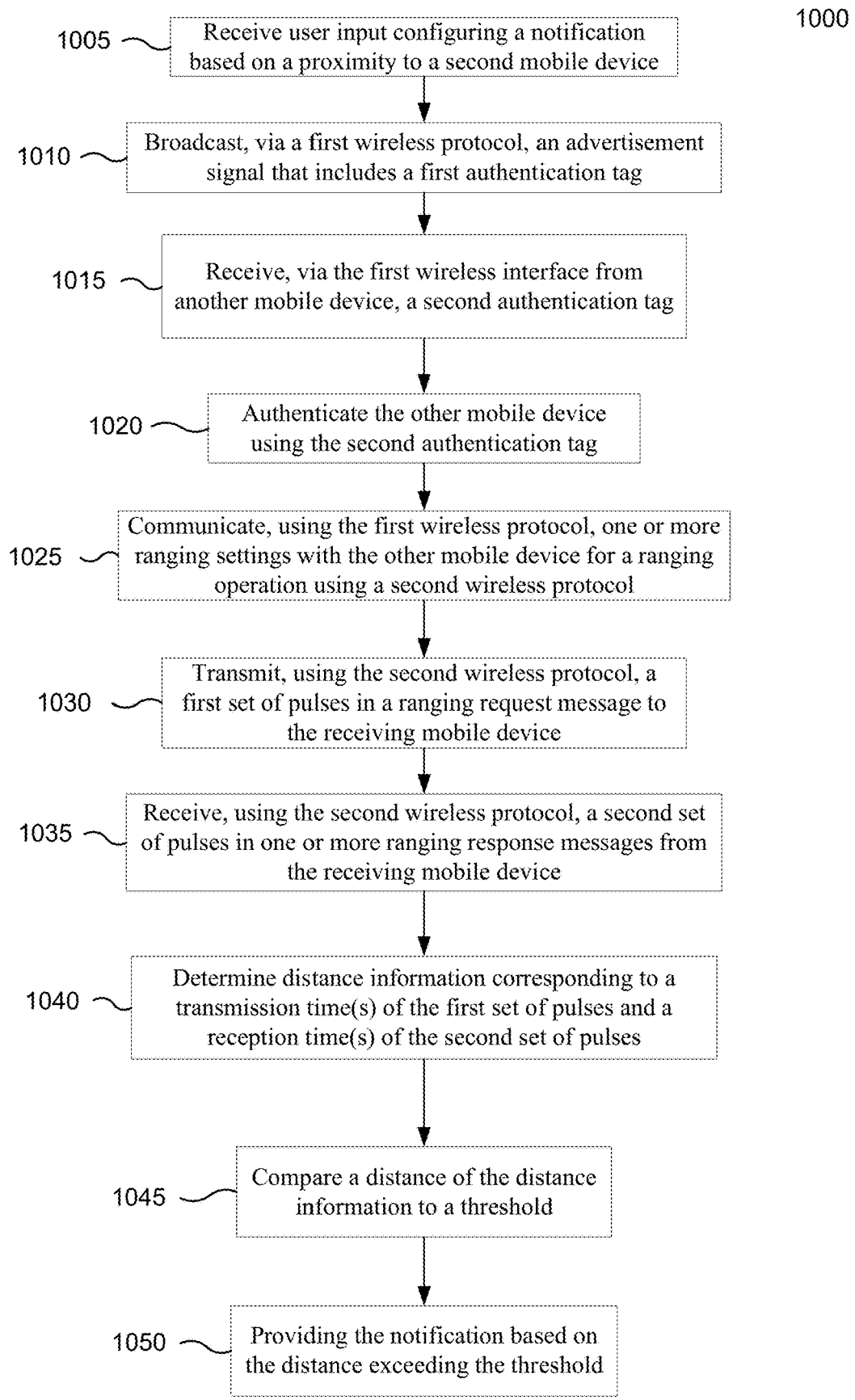
FIG. 10 is a flowchart of a method for providing notifications using a ranging operation according to embodiments of the present disclosure.

FIG. 10 is a flowchart of a method 1000 for providing notifications using a ranging operation according to embodiments of the present disclosure. Method 1000 can provide a notification at a first mobile device of a first user and be performed by the first mobile device. Aspects of method 1000 may be performed in a similar manner as method 700 of FIG. 7.

At block 1005, a user interface of the first mobile device receives user input to configure a notification, e.g., a reminder or an alert. The notification can be provided by the first mobile device based on a proximity of the first mobile device to a second mobile device, which may be of a second user or of the first user. The proximity can be determining using a ranging operation, as described herein.

At block 1010, a first wireless protocol of the first mobile device is used to transmit (e.g., broadcast) an advertisement signal that includes a first authentication tag of the first mobile device. Block 1010 may be implemented in a similar manner as block 715 of FIG. 7.

At block 1015, the first mobile device receives, via the first wireless protocol from the second mobile device, a second authentication tag of the second mobile device. Block 1015 may be implemented in a similar manner as block 720 of FIG. 7.

At block 1020, the first mobile device authenticates the second mobile device using the second authentication tag. The second mobile device can use the first authentication tag to authenticate the first mobile device. Block 1020 may be implemented in a similar manner as block 725 of FIG. 7.

At block 1025, the first wireless protocol is used to communicate one or more ranging settings with the second mobile device for a ranging operation to be performed using a second wireless protocol. Block 1025 may be implemented in a similar manner as block 730 of FIG. 7.

At block 1030, the second wireless protocol is used to transmit a first set of one or more pulses in a ranging request message to the second mobile device in accordance with the one or more ranging settings. The second wireless protocol can use a pulse width that is less than a pulse width used by the first wireless protocol. Block 1030 may be implemented in a similar manner as block 735 of FIG. 7.

At block 1035, the first mobile device receives, using the second wireless protocol, a second set of one or more pulses in one or more ranging response messages from the second mobile device. Block 1035 may be implemented in a similar manner as block 740 of FIG. 7.

At block 1040, distance information corresponding to one or more transmission times of the first set of one or more pulses and one or more reception times of the second set of one or more pulses is determined. Block 1040 may be implemented in a similar manner as block 745 of FIG. 7.

At block 1045, a distance of the distance information is compared to a threshold. As examples, the distance can be include a radial distance and/or an angular distance. In some implementations, the distance can be a vector that specifies a relative distance (position) between the two devices, and a score can be assigned to the relative position. For example, different regions can be defined around a device. The regions may be defined with respect to a pointing direction of the device. The threshold can correspond to the assigned score, e.g., by the score being compared to the threshold. In various embodiments, the threshold can be specified by a user or a manufacturer of the device. The threshold can be modified over time, e.g., based on whether the user interacts with the phone in response to a notification.

At block 1050, the notification is provided based on the distance exceeding the threshold. The distance can exceed by being less or greater than the threshold depending on how the notification is setup. Accordingly, in some implementations, the notification can be provided when distance is greater than the threshold, e.g., to alert a user. In other implementations, the notification is a reminder, and the notification can be provided when distance is less than the threshold. In various implementations, the notification can include an audio output, a visual output, or a haptic output, or any combination thereof.

In some embodiments, the distance information can include a plurality of distance measurements over time, e.g., over 30 seconds, a minute, two minutes, etc. The notification can be provided based on distances of the plurality of distance measurements being less than the threshold for at least a specified amount of time.

VII. Suggestion of Recipients Based on Proximity

Communication applications, e.g., email and text messaging, typically have an input window for specifying a recipient of the communication. A user can enter characters (e.g., alphanumeric and certain special characters, such as '@') into the input window so as to identify the recipient(s). For example, a user can enter a name, email address, or a phone number. When the user enters a first character, such communication applications may provide a list of suggested recipients. But, such communication applications require that at least one character is entered before providing the suggested recipients. It would be desirable to provide a reliable list of suggested recipients without the user having to enter some input, thereby making the experience easier and more efficient for the user. It is also desirable to use additional criteria (e.g., other than common recipients) that is specific to a particular situation to determine potential recipients to suggest.

Embodiments may incorporate the detection of neighboring mobile devices via wireless communications in the vicinity around the mobile device as a criteria for determining recipients to suggest. A contact database can be cross-referenced with the detected neighboring devices. Ranging measurements can be performed to provide greater accuracy of a relative distance to another mobile device, e.g., for determining whether the other mobile device is sufficiently close to provide is a suggested recipient. The relative distance can also be used for ordering the neighboring devices based on a relative position (e.g., distance and/or angle). The ordering can be from closest to farthest. Weightings can be used in various zones to have a preference for certain angles relative to a pointing direction of a device.

Figure 11B:
FIG. 11B shows a screenshot of a communication application providing a list of suggested recipients in response to a user starting a new message, without user input of a character, according to embodiments of the present disclosure.
Figure 11A:
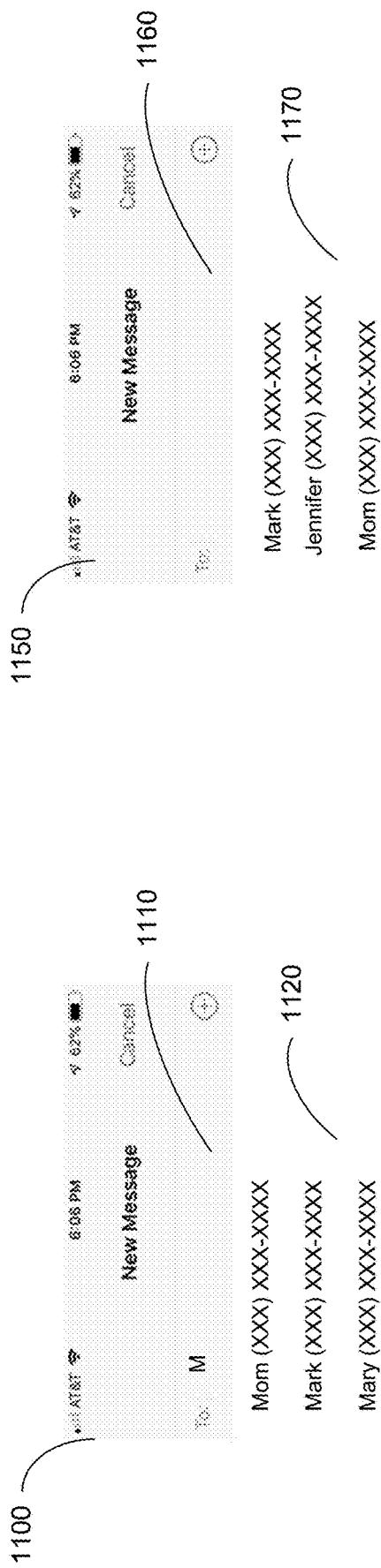
FIG. 11A shows a screenshot of a communication application providing a list of suggested recipients in response to user input of a character.

FIG. 11A shows a screenshot 1100 of a communication application providing a list 1120 of suggested recipients in response to user input of a character. The user has opened the communication application (for text messaging, as shown), and has entered the character 'M' into an input window 1110. In response, the communication application has provided list 1120 of suggested recipients that start with the letter M. In the example shown, Mom, Mark and Mary are provided in that order, along with their recipient contact information, which corresponds to phone numbers in this example.

FIG. 11B shows a screenshot 1150 of a communication application providing a list 1170 of suggested recipients in response to a user starting a new message, without user input of a character, according to embodiments of the present disclosure. The communication application can be executing on a first mobile device. Prior to providing list 1170 of suggested recipients, the first mobile device may detect one or more neighboring mobile devices via wireless communication, e.g., various forms of Bluetooth, Wi-Fi, or UWB. In some embodiments, the neighboring mobile devices can each transmit an identifier, e.g., in an in advertisement message. In some implementations, the identifiers can be previously obtained, e.g., via peer-to-peer or via a server, by the first mobile device. For instance, the identifiers can be obtained when a user creates a contact in a contact list.

Any neighboring mobile devices that have identifiers corresponding to a contact in a stored contact list in the first mobile device can be identified, and included in the list of suggested recipients. For instance, the identifier can be a hash, and the first mobile device can use the hash to look up contact information for providing to the user. In this manner, the user does not have to type in any characters into an input window 1160 before receiving list 1170 of suggested recipients.

Such a list of suggested recipients can also be provided based on recipients that are frequently or recently messaged, e.g., at the current time of day. Such historical interactions with the same or other communication application can be used to train a machine learning model as a suggestion engine. The suggestion engine can use the discovery of neighboring devices, along with contextual information (e.g., time, location, communication application used), to determine list 1170 of suggested recipients. In some implementations, a ranging operation can be performed to determine distance information (e.g., radial and/or angular distance), which can also be used by the suggestion engine.

In the example shown, Mark is displayed first before Mom. This may occur because Mark's device was detected via wireless communication, and thus to be within the vicinity of the first mobile device on which the communication application is executing. Mom's device may not be detected as a neighboring device, and thus Mark may be listed first. For example, the existence of Mark's device as a neighboring device can outweigh a higher frequency of communications to Mom, e.g., according to criteria used by a suggestion engine. Jennifer is newly added, e.g., because Jennifer's device is detected as a neighboring device. Thus, Jennifer can be identified as a suggested recipient. Additional recipients may be provided, but are not shown for ease of illustration.

After the list is provided, a user can select one of the suggested recipients for sending the new message. The selection can be received in various ways, e.g., by a selecting via touch or providing a voice command, as may be done by saying "Mark" or "entry 1." Then, after the message is composed, the message can be sent to the selected recipient.

A. Suggestion Using Discovery of Nearby Devices

Figure 12:
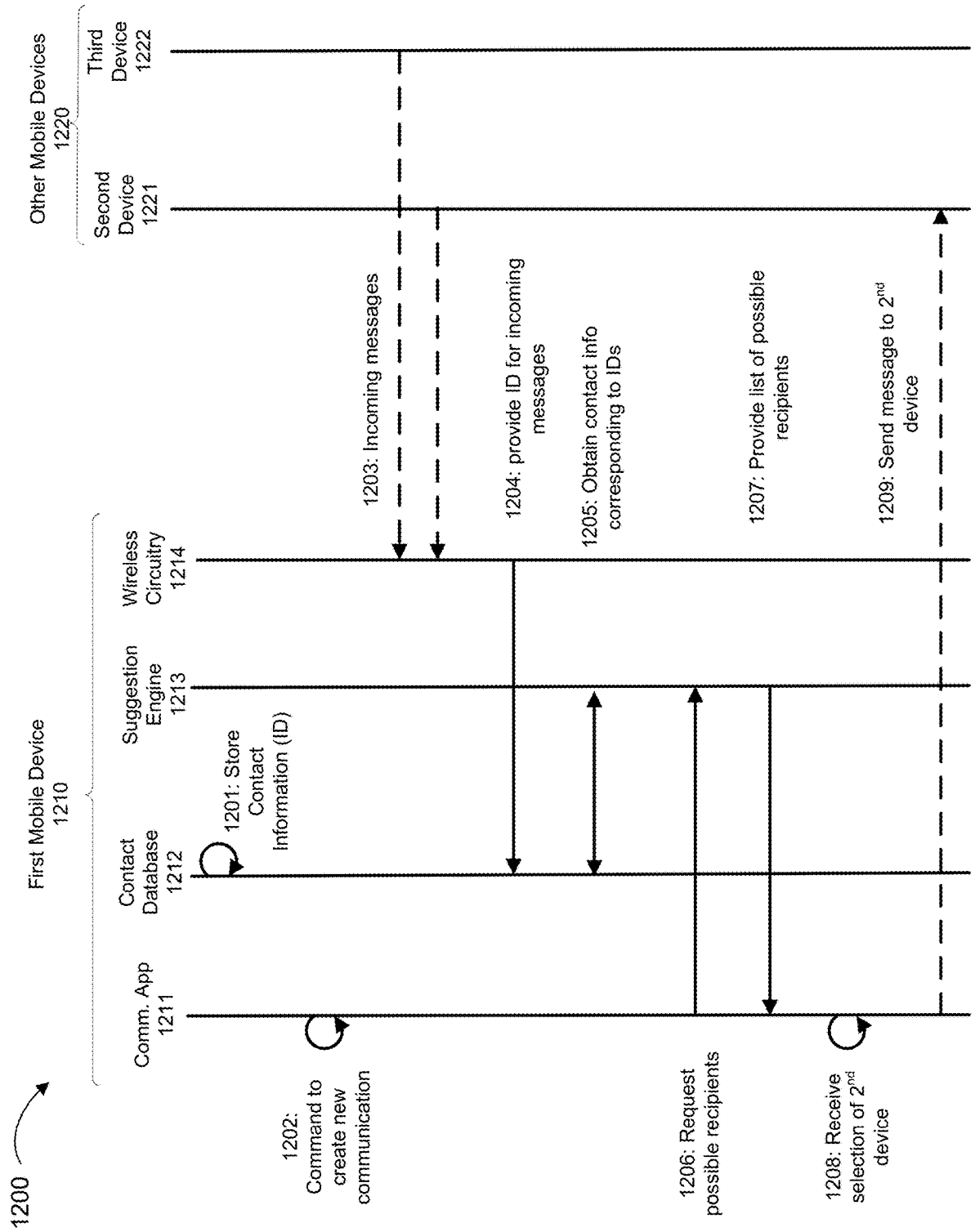
FIG. 12 is a sequence diagram of a process that uses proximity to other devices to suggest recipients for communications according to embodiments of the present disclosure.

FIG. 12 is a sequence diagram of a process 1200 that uses proximity to other devices to suggest recipients for communications according to embodiments of the present disclosure. Process 1200 involves a first mobile device 1210 (e.g., a mobile phone, wearable device, such as a watch, or a tablet) and other mobile devices 1220. First mobile device 1210 can communicate with the other mobile devices 1220 via any suitable wireless communications, e.g., Bluetooth, Wi-Fi, or UWB. Other mobile devices 1220 can include a second mobile device 1221 and a third mobile device 1222.

First mobile device 1210 can include a communication application 1211, a contact database 1212, a suggestion engine 1213, and wireless circuitry 1214. These components can interact with each other. For example, first mobile device 1210 can have a memory that stores contact database 1212. Wireless circuitry 1214 can provide proximity information to suggestion engine 1213. Suggestion engine 1213 can access the memory to retrieve contact information from contact database 1212. And, suggestion engine 1213 can provide suggested recipient(s) to communication application 1211.

At step 1201, contact database 1212 stores contact information for a plurality of contacts. The contact information for a contact can include a stored identifier, and thus the stored identifier is associated with the contact. For example, a database field for a contact can include the stored identifier, so that other fields of the contact are associated with the stored identifier field.

At step 1202, communication application 1211 receives a command to start a new communication. Such a command can be received in various ways through a user interface, such as a touch screen, voice commands, a keyboard, a pointing device, and the like. For instance, a user can state "new message" or "new email," which can occur before the communication application is explicitly opened. Thus, the voice command can open a default communication application associated with a message or email, and the voice command can also act to open a new message. As another example, a user can open a communication application on a touch screen, and then provide a voice command of "new message" or select a new message button on a window of the touch screen. An example window can be seen in FIG. 11B.

At step 1203, wireless circuitry 1214 detects incoming messages from other mobile devices 1220. In various embodiments, the incoming messages can be generated by or include received identifiers corresponding to the other mobile devices 1220, e.g., a second identifier for second mobile device 1221 and a third identifier for third mobile device 1222. As an example, the identifier can be a cryptographic key that is used to generate a digital signature, decrypt a digital signature, or otherwise generate a hash of a portion of the incoming message. The cryptographic key that authenticates that message portion (e.g., capable of generating a matching hash) can be determined as the correct identifier.

In some implementations, the other mobile devices 1220 can periodically emit signals (e.g., advertisement signals) with a respective identifier, and potentially include other information as well, such as a network address. Such signals may be emitted as a broadcast signal, e.g., using Bluetooth LE. In other implementations, first mobile device can transmit a request message, which requests for IDs of neighboring devices. The other mobile devices 1220 can respond with messages that include the respective IDs. Accordingly, the detection of such emitted signals from the other mobile devices 1220 can occur as part of a discovery process, with initial signals emitted by the other mobile devices 1220 or first mobile device 1210.

In various embodiments, step 1203 may occur before or after step 1202. For example, first mobile device 1210 may periodically turn on wireless circuitry 1214 to look for incoming messages, so as to provide a list of neighboring devices, which can be stored for later use.

At step 1204, the received identifiers (IDs) from the incoming messages are sent to contact database 1212, e.g., directly, via suggestion engine 1213, or via other component of first mobile device 1210. Wireless circuitry 1214 or other component can parse the incoming messages to determine the received identifiers. For example, an incoming message can have a specific format, e.g., with labels specifying particular data or a predetermined format with different slots for different types of data. As with other steps, step 1204 can be triggered by various actions, e.g., by receiving of the incoming messages or by a message from communication application 1211 in response to the command at step 1202.

In other embodiments, the parsing can involve cryptographic operations, such as decryption or hashing. Such operations may occur when the stored identifiers correspond to cryptographic keys. For example, a portion of the incoming message (e.g., a network address) can be hashed or signed using a cryptographic key. Then, first mobile device 1210 can use the stored cryptographic keys to operate on a portion of the message that is sent in the clear, e.g., an unhashed/unencrypted network address. A matching key is one that provides a same hash or signature as was in the incoming message. Such cryptographic operations are also described in more detail herein.

At step 1205, suggestion engine 1213 can obtain the contact information for the other mobile devices 1220 from contact database 1212. The obtaining of the contact information can occur in various ways. For example, suggestion engine 1213 can send a request to contact database 1212, or contact database can push the contact information to suggestion engine 1213. Either way, contact database 1212 can be accessed using the received identifiers to obtain the contact information for the other mobile devices 1220. Also, the obtaining of the contact information can occur in response to various triggers, e.g., in response to the IDs being providing to contact database 1212 or in response to receiving the command at step 1202. The latter may occur when first mobile device 1210 receives the incoming messages independently (e.g., asynchronously) from operation of communication application 1211. As described above, first mobile device 1210 can periodically detect incoming messages, thereby resulting in such an independent operation.

In some embodiments, contact database 1212 or other component (e.g., suggestion engine 1213) could store the contact information for neighboring devices. This list of neighboring devices can be updated periodically. Thus, at any given instance, the list of neighboring devices should generally reflect who is near the user of the first mobile device.

At step 1206, communication application 1211 can send a request for suggested recipients to suggestion engine 1213. Communication application 1211 can send such a request in response to receiving the command to create a new communication at step 1202. Step 1206 may occur at various relationships to other steps of process 1200, e.g., after step 1202 but before step 1203, before step 1204, or before step 1205.

In some embodiments, in response to the request from communication application 1211 or at an earlier time, first mobile device 1210 can perform ranging with other mobile devices 1220. Distance information (e.g., radial and angular distances) can be determined and used to suggest one or more recipients. For example, steps of FIG. 4 may be performed. The identifier of FIG. 12 can be used to perform the authentication in step 404. The event 402 can correspond to the creation of the new communication at step 1202. The additional steps 403-409 can then be performed, e.g., with step 404 being performed using the identifier (e.g., a cryptographic key).

At step 1207, suggestion engine 1213 can provide the contact information for one or more of the other mobile devices 1220 in a list of suggested recipients to the communication application. Step 1207 can be performed responsive to the command to create the new communication at step 1202. In response to the request at step 1206 or at an earlier time (e.g., after receiving the contact information), suggestion engine 1213 can use the contact information of the neighboring devices to determine a list of suggested recipients to the communication application. Although not shown, suggestion engine 1213 can receive other information to determine the list of suggested recipients, as described herein. For example, distance information obtained from a ranging operation can be used.

At step 1208, communication application 1211 receives a selection of one of the suggested recipients. In this example, the selected recipient corresponds to second mobile device 1221. As described above, the recipient can be selected in various ways.

At step 1209, communication application 1211 sends the new communication to the second mobile device. The new communication can be sent via the same or a different wireless protocol than used for incoming messages received at step 1203. As examples, the communication may be sent via a peer-to-peer mechanism, an access point (e.g., a router), or a server.

B. Discovery of Devices and Contacts

As described above, a discovery process can determine whether the device of a contact is in a vicinity of a first device. The discovery process can involve obtaining an identifier of the other device at a previous registration time, e.g., when added to a contact database. The identifier can be obtained directly from the other device, via a discovery to which the identifier is sent, or an identity server, which can securely store the identifier. Further example details of the discovery process are provided below.

In one example, when a person is added as a contact, their contact information can be used to retrieve the identifier stored at an identity server. The identity server can store the identifier in association with the contact information, so it can be retrieved and sent to the first device. In another example, the identifier can be transmitted locally from one device to another, e.g., along with the contact information. Then, when the first device detects an incoming message with the identifier, the contact information for the user of the other device can be retrieved.

In some embodiments, the incoming message may be encrypted such that the identifier is encrypted. Symmetric or asymmetric cryptographic keys can be used to encrypt and decrypt. Along with the identifier, the first device can obtain a cryptographic key, e.g., directly or via a server. Then, when the incoming message is detected, the stored cryptographic keys can be used until one is found that can decrypt the incoming message. The decrypted identifier can then be used to identify the corresponding contact information.

In other embodiments, the incoming message may include a hash or signature of a message portion that is sent in the clear (e.g., a network address). Stored identifiers (keys in this example) can operate on the cleartext or a signature to find a match. For example, a key can decrypt the signature to obtain the clear portion, thereby authenticating the other device since the decryption signature matches the cleartext of the message. Non-matching keys would generate a result that does not match the cleartext, and thus it can be determined that a particular incoming message does not correspond to non-matching keys.

As another example, the key can operate on the clear text to generate another hash, which can be compared to the hash received in the incoming message. Each of a set of stored keys can be used until a matching hash is determined. The key that provides a matching operation is then determined as the identifier, which can be used to access a contact database to retrieve contact information. Examples of a hash include SipHash and hash-based message authentication code (HMAC).

In some embodiments, two devices can exchange identifiers, e.g., cryptographic keys. Such an exchange could occur when two devices are held close to each other, e.g., touching each other, which may occur after the users provide some indication that contact information is to be shared. The identifiers and the contact information can then be stored in a contacts database.

In one implementation, an incoming message (e.g., an advertisement packet) can include a network address (e.g., generated periodically) that is associated with the other device and a hash value that is calculated using the network address and a cryptographic key (example of an identifier) that is associated with the other device. Then, the first device can retrieve from memory and iterate through a plurality of known cryptographic keys until the correct key is found by a match. Alternatively, the incoming message can include a key identifier (e.g., a user identifier or a device identifier) that may be used to retrieve the correct key. The first device can then calculate a temporary hash value using the network address and a first known cryptographic key. The temporary hash value can be compared to the received hash to determine if they match. In response to identifying that the temporary hash value and the hash value match, contact information corresponding to the first known cryptographic key can be retrieved, e.g., in step 1205 of FIG. 12. In some implementations, ranging operations (e.g., as described herein) can be performed in response to identifying the match.

Such an example uses symmetric keys, but asymmetric keys can also be used. For example, a second device (e.g., 1221) can provide a public key to the first device. The second device can use a private key to generate a digital signature of the network address or other cleartext, and include the digital signature in a message, as described herein. The first device can then decrypt the digital signature using the public key to obtain a result that is compared to the cleartext. If there is a match, then the first device can determine the incoming message was from the second device.

In embodiments where the message includes a network address, the address may be changed periodically. In this manner, the identity of the device cannot be tracked over time, thereby preserving privacy. Such a network address can be a media access control (MAC) address.

C. Use of Ranging for Suggesting Recipients

A first device can determine a relative position of other devices. For example, a first device can detect a signal strength of an incoming message, also referred to as a received signal strength indicator (RSSI). If a standard emission strength is used by such devices, then the decay of the signal over distance traveled can be used to determine the relative distance to the second device. A calibration (mapping) function can be determined from measurements made at different known distances between the devices. These known differences can be used as training data to determine the calibration function that maps RSSI to distance. Different mapping functions can be determined for different types of devices, e.g., different models of a phone and to distinguish between phones and tablets.

In other embodiments, time-of-flight (TOF) measurements can be used to determine a relative distance to the other devices, as described herein. The RSSI measurements and TOF measurements can be used together, e.g., a weighted average may be used of the distances or positions determined by the two techniques. Some embodiments can use the distance information to determine whether another device is sufficiently close to suggest as a recipient and/or order recipients based on the distance information; other information can also be used for such purposes.

Figure 13:
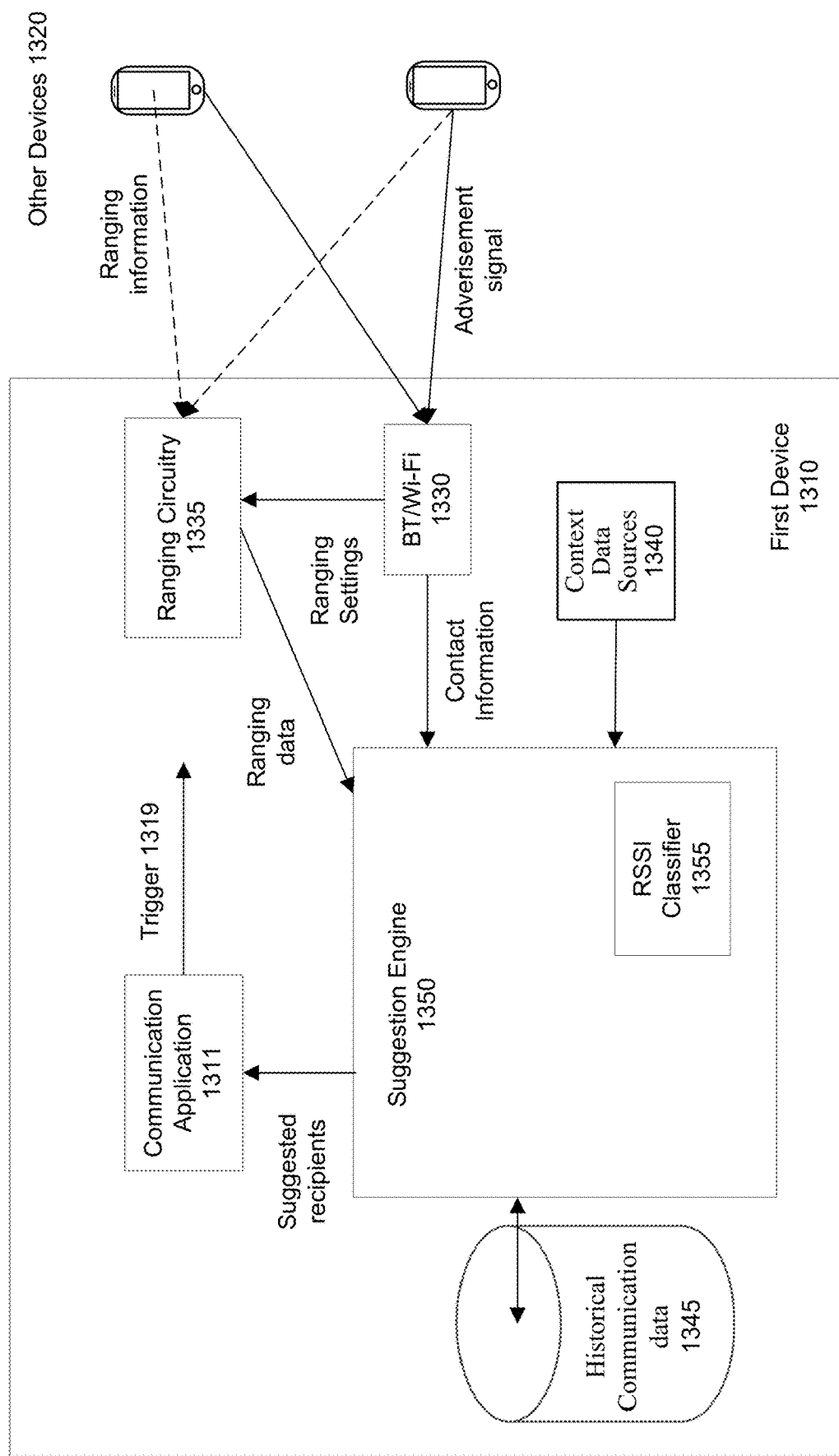
FIG. 13 shows a first device performing ranging with other devices for use in suggesting recipients to a communication application according to embodiments of the present disclosure.

FIG. 13 shows a first device 1310 performing ranging with other devices 1320 for use in suggesting recipients to a communication application according to embodiments of the present disclosure. First device 1310 may correspond to first mobile device 1210 of FIG. 12, and other devices 1320 may correspond to other mobile devices 1220. Other elements of FIG. 13 may correspond to similar elements in FIG. 12.

Communication application 1311 can have a user interface for receiving user input to create a new communication (e.g., an email or message). In response to this user input, communication application 1311 can send a trigger command 1319 to ranging circuitry 1335 and/or BT/Wi-Fi circuitry 1330, e.g., corresponding to circuitry in FIG. 5. These circuits can determine which devices are in proximity to first device 1310.

Other devices 1320 can emit signals (e.g., advertisements) using a wireless protocol, such as Bluetooth or Wi-Fi. These signals can be detected by BT/Wi-Fi circuitry 1330, which can perform authentication of the signals as corresponding to a particular contact in a contact database (not shown in FIG. 13), e.g., as described herein. The contact information can be sent to a suggestion engine 1350, which can use the contact information to determine a list of suggested recipients to send to communication application 1311.

BT/Wi-Fi circuitry 1330 can send ranging settings to ranging circuitry 1335. In some implementations, ranging circuitry 1335 can begin a ranging operation in response to receiving the ranging settings from BT/Wi-Fi circuitry 1330. The ranging settings can include various data, e.g., as described above. Further, the ranging settings can include a network address, which may have been used in authenticating one of the other devices 1320. In this manner, ranging circuitry 1335 can obtain a network address to send ranging signals. The network address can be used to correlate the ranging data to a particular contact in the contact database. For example, the contact information sent from BT/Wi-Fi circuitry 1330 can include the network address (or other identifier), and ranging circuitry 1335 can include the network address (or other identifier), so that suggestion engine 1350 can correlate the ranging data to the contact information.

Suggestion engine 1350 can use various combinations of the contact information, ranging data, current context data from context data sources 1340, and historical communication data 1345 to determine a list of suggested recipients. As examples, context data sources 1340 can include movement information from an inertial motion unit (IMU), time and date from a clock and calendar app, location from GPS or other location circuitry, and previous applications used before communication application 1311.

Suggestion engine 1350 can use historical communication data 1345 stored in a database. Each historical communication can be recorded as a separate time entry in the database. Such records can be saved periodically, e.g., every two seconds or other time scale where it is likely only one type of interaction would occur per time interval (temporal encoding). Each historical usage record can include any of the contextual data mentioned herein.

Historical communication data 1345 can store records of historical user communications that can be mined for patterns and/or similarities to a current context so as to suggest a list of recipients that are most likely to be selected. For example, recipients that are messaged frequently during a particular context can be identified when the current context is the particular context. Such a list may be ordered, e.g., based on relative distance. The ordering can be from closest to farthest. Weightings can be used in various zones to have a preference for certain angles relative to a pointing direction of a device.

In some embodiments, each the criteria used by suggestion engine 1350 can be used by a separate submodel to assign an order or a score (e.g., a ranking) for that particular criterion. For example, one list of scores for recipients may be determined based on ranging information, and another list can be determined based on historical communications. The scores in the two lists can be merged using a weighted average to obtain a final list of recipients. Recipients have a score above a threshold can be provided in the list. Each of the criteria (features) can be assigned predetermined weights, e.g., as determined through heuristics or machine learning. In another implementation, such weights can be assigned dynamically based a variable. For example, the more the number of neighboring devices may indicate that the proximity criteria should be weighted less.

Suggestion engine 1350 can be implemented in various forms and use various models. For example, more than one model may be used, and the results of the models can be merged in an ensemble engine. A first type of model can run periodically (e.g., every night), but then be saved such that it is static until the next training session is performed. Such periodic generation and saving would be uncorrelated to user requests, since the periodic operation is not done in response to a user request. Such training can include a pattern mining routine that mines the historical interactions for patterns of when an application, recipient, or combination of application/recipient are selected. A second type of model can use recent interactions to generate a model on-demand when a request for a suggestion is received, e.g., in response to generate a new communication.

The pattern model may tune the predictions of recipients to be more specific to the user's behavior based on their past behaviors. The pattern model may operate on all interaction data stored in the database to generate rules based on identified repetitive patterns of features. The pattern model may execute overnight or during other idle times of the mobile device. The pattern model may extract data from the interactions, output another database (referred to herein as the pattern database) that can be queried at the time a prediction is being made. For each of a set of input criteria, such as communication application, time of day, etc., the pattern database can specify a list of recipients to suggest.

Such a pattern model can take various other forms besides a data base of rules having certain criteria as an antecedent and outputting suggests apps/recipients as a consequent. For example, in some implementations, a neural network may be used in the pattern model. Other examples of machine learning models include linear regression, logistic regression, support vector machines, and decision trees.

In some embodiments, scores can be assigned based on the ranging operation. A relative position of each of the other devices can be determined based on the distances determined using multiple antennas (e.g., UWB antennas, which may use triangulation). The area around the first device can separated into different regions. The regions may be stratified by radius and angle relative to a pointing direction of the first device. For example, the closest radial region within a specified angular range of the pointing direction can be given the highest score, and a region farthest away radially and 180 degrees from the pointing direction can be assigned the lowest score. As an example, this set of scores can be normalized to be within a particular range, e.g., 0-100.

This set of scores can also be assigned based on historical communications, which may occur in various contexts. A frequency of communications in all contexts or in a particular context (e.g., a frequency after filtering for a current context) can be used to determine this set of scores. These scores can also be normalized to have values within a particular range, e.g., 0-100.

The two sets of scores can be merged in many ways, e.g., by merging scores and ordering based on the combined scores or using a set of rules. For example, one rule could be that if another device is in the closest radial region that is within a specified angular range of the pointing direction, then that device would always be placed first, regardless of its score using the historical communications. As another example rule, an ordering based on the ranging scores can be modified based on the number of communications, e.g., by bumping up or down a particular device by a specified number of ordered positions based on the number of communications, as may be determined for the current context.

In some embodiments, the ranging scores or the raw distances (e.g., for each antenna) can be used as features to a machine learning model. The training set can include a set of communications for which a recipient is known, as well as the particular context (including ranging distances). Such a machine learning model can be continually updated based on the accuracy of the predictions for the recipients of new communications for which contexts are known.

As described above, RSSI can be used for the ranging measurements. RSSI may be determined in addition to TOF distance measurements. Thus, a TOF-derived radial range (e.g., measured using UWB), TOF-derived angle with respect to a pointing direction (e.g., measured using UWB), and RSSI (e.g., measured using any form of Bluetooth) can all be used in determining a list of suggested recipients, e.g., by inputting into a suggestion/prediction model. A raw RSSI measurement and a classified range can be used.

In some embodiments, an initial model can use the RSSI measurements to obtain a range classification, which may be used along with the determined TOF values. For example, suggestion engine 1350 can receive the RSSI measurements from BT/Wi-Fi circuitry 1330. An RSSI classifier 1355 can determine a range classification using the RSSI measurement. Any number of range classifications can be used, e.g., 3, 4, 5, etc. In one implementation, three classifications could be close, middle, and far, which may be specified using numbers or any other characters. To determine the range classification, RSSI classifier 1355 can identify the type of device emitting the signal, and then use a corresponding classification model, e.g., trained using measurements at known distances for a known type of device. The range classification can be provided to another model that is part of the suggestion engine 1350, as described herein. In some implementations, RSSI classifier 1355 can use more than one RSSI measurements, e.g., a series of measurements can be used to performed the classification.

D. Timing of Ranging Circuitry

The ranging measurements can be taken at various times, e.g., before or after a user starts a new communication. For example, ranging circuitry 1335 and/or BT/Wi-Fi circuitry 1330 may have already made some measurements, with distances or range classifications already determined. Such distance information can be stored for retrieval when a new communication is started. As examples, the distance information (distances, range classifications, etc.) can be stored in suggestion engine 1350, ranging circuitry 1335 and/or BT/Wi-Fi circuitry 1330, or other component of first device 1310. Then, once a request is received (e.g., by suggestion engine 1350 or to ranging circuitry 1335 and/or BT/Wi-Fi circuitry 1330), the distance information can be retrieved.

The distance measurements may be done periodically. New measurements may overwrite old measurements, potentially with a certain number of measurements made at different times be stored. Each distance measurement may have a time stamp. The time stamp can be used to determine if the measured values are recent enough to use (e.g., by comparing to a timing threshold). Accordingly, when a user wants to compose a message, the suggested recipients can use the stored information for the neighboring devices, so that ranging circuitry 1335 and/or BR/Wi-Fi circuitry does not have to be spun up or otherwise have their energy level increased, although they may need to be spun up periodically. If the measurements are not recent enough, then new measurements can be performed.

E. Method for Suggesting Recipients

Figure 14:
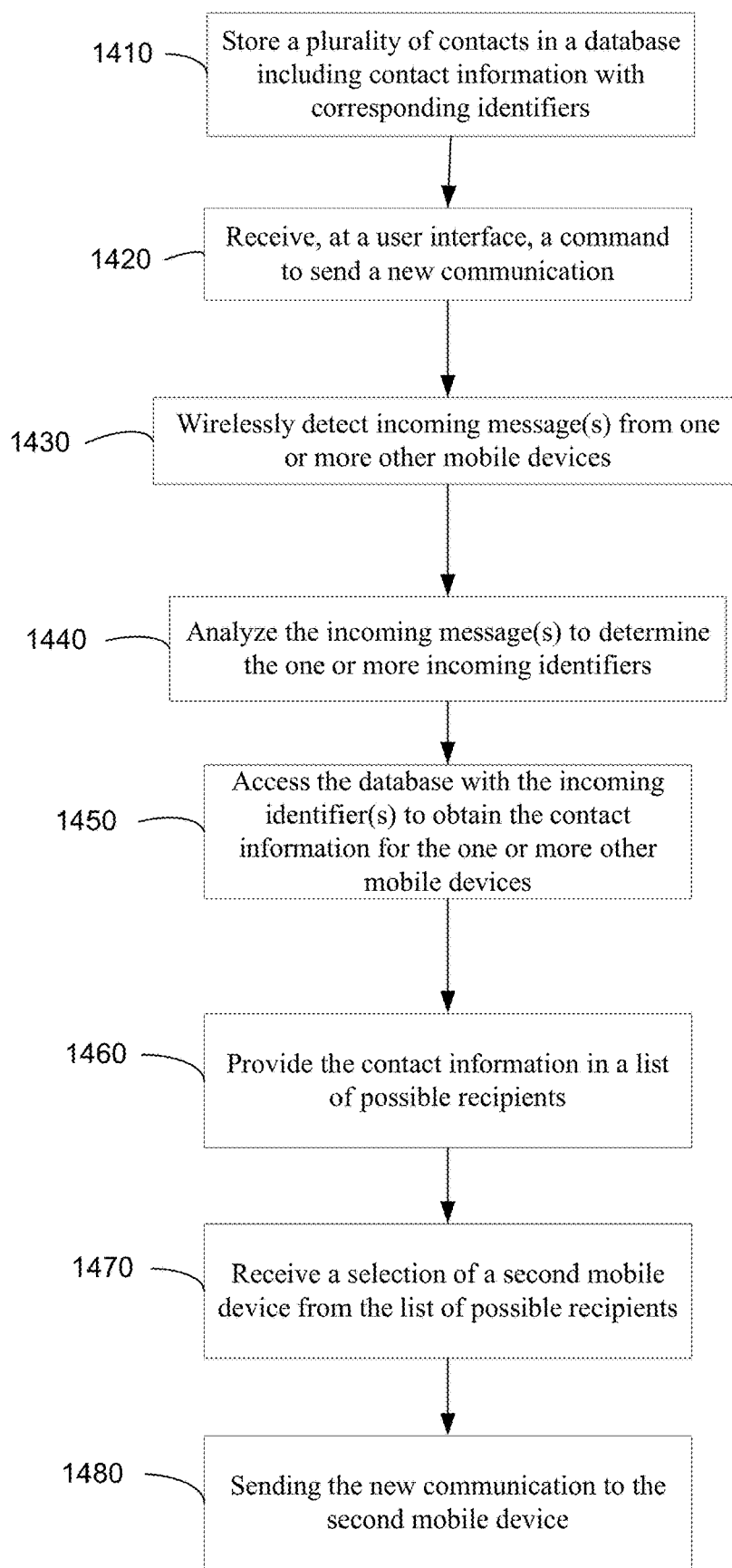
FIG. 14 is a flowchart illustrating a method of providing a communication interface to a user according to embodiments of the present disclosure.

FIG. 14 is a flowchart illustrating a method 1400 of providing a communication interface to a user according to embodiments of the present disclosure. Method 1400 may be implemented by a first mobile device, which may correspond to first device 1310 or first mobile device 1210. The communication interface can provide a list of suggested recipients for a new communication based on a proximity of another device, as determined using wireless communications. In some implementations, the communication interface can provide the list of suggested recipients before a user provides (e.g., types) any characters for a recipient.

At block 1410, a database of the first mobile device stores a plurality of contacts. The database can include contact information for each of the contacts, e.g., phone number, email address, name, etc. Each contact (e.g., each entry of the database) can be associated with a stored identifier, such as a cryptographic key or a unique identifier (e.g., for a user or a device). The identifier can be stored as a field in the database such that a query with a particular identifier can be used to retrieve the contact information for the contact corresponding to the particular identifier.

At block 1420, a user interface of the first mobile device receives a command to send a new communication. The new communication can be sent using a communication application executing on the first mobile device. Various communication applications can be used, e.g., for text messaging, emails, a phone call, a video call, and the like. The user interface can be specific to a given communication application, e.g., when a user opens up the communication application and selects a button to start a new message. In another implementation, the user interface can be a general interface, e.g., a voice command interface, such that a particular communication application does not need to have already been opened. The voice command can specify the communication application to use; a default application can be set for certain keywords, e.g., a certain text messaging application can be selected when using the term "message" in a voice command.

At block 1430, one or more incoming messages are wirelessly detected from one or more other mobile devices. In various embodiments, the one or more incoming messages may be generated using one or more incoming identifiers corresponding to the one or more other mobile devices or may include the one or more incoming identifiers corresponding to the one or more other mobile devices. For example, the identifier may correspond to a cryptographic key that is used to generate a digital signature or hash of a portion of the message, where the digital signature or hash is sent as a portion of the message. As another example, a message can include the identifier, which can be used directly to determine contact information corresponding to the other device.

In some embodiments, the one or more incoming messages can be broadcast by the one or more other mobile devices. Such broadcast messages can be emitted periodically by the other mobile devices. The first mobile device can similarly broadcast such signals periodically so that neighboring mobile devices can detect it.

At block 1440, the one or more incoming messages are analyzed to determine the one or more incoming identifiers.

In various embodiments, blocks 1430 and 1440 may be performed before or after block 1420, e.g., as described for FIGS. 12 and 13. The analysis may simply parse the incoming messages to extract data. In another implementation, the analysis may perform operations (e.g., cryptographic operations) on all or portions of data in the incoming messages.

Block 1440 may include authentication of the incoming message(s), e.g., when the identifier is a cryptographic key. In some implementations, when the one or more incoming messages are generated using one or more cryptographic keys, the analysis can include applying a stored cryptographic key to a first portion of an incoming message to obtain a cryptographic result. The cryptographic result can be matched to a second portion of the incoming message. For example, a cryptographic key can be used to generate a hash of a cleartext portion of the message (e.g., a network address) and compared to a hash portion received in the message. As another example, a decryption operation may be performed on an encrypted portion of the message, where the decrypted result should match to a cleartext portion if the correct cryptographic key was used. The stored cryptographic key used for decryption can be a public key, where the incoming message is generated using a private key corresponding to the public key. In another implementation, both devices can use the same key for the respective cryptographic operation. In such a case, the one or more incoming identifiers can include one or more cryptographic keys that are used to generate the incoming message.

At block 1450, the database is accessed with the one or more incoming identifiers to obtain the contact information for the one or more other mobile devices. As described herein, entries in the database can include a field for identifiers. Once the matching identifier is determined, the database can be queried to identify the contact whose entry includes the matching identifier. Any number of data items of that entry can be retrieved for providing and a list of suggested recipients. For example, a photo may be retrieved and displayed along with other contact information in the list.

At block 1460, the contact information for the one or more other mobile devices is provided to the communication application as a list of suggested recipients. The list can be provided in response to the command to send the new communication. For example, blocks 1430-1460 may be performed in response to the commands to start a new communication, or block 1460 can be performed in direct response to the command. As another example, additional steps may be performed, e.g., obtaining of other data, such as contextual data, historical communication data, or ranging data; such additional steps can be performed after block 1420 but before block 1460.

Block 1460 may be at least partially implemented using a suggestion engine, e.g., as described herein. For example, a database of historical user interactions can include historical recipients, historical communication applications, and historical contextual data. The list of suggested recipients may be determined using the historical user interactions. Such a suggestion engine can suggest other devices that are not within proximity of the first device. And, not all of the neighboring devices may be included in the list of suggested recipients. For example, the suggestion engine may exclude one or more neighboring devices that do not have sufficient historical communications with the first device. Thus, the one or more other mobile devices may be only a portion of the neighboring devices.

In some embodiments, the list of suggested recipients is provided prior to receiving an indication of an intended recipient. For example, suggested recipients can be provided before the user enters any characters into a text window. Such a list of suggested recipients may be ordered, e.g., based on distance information determined in a ranging operation.

At block 1470, the communication application receives a selection of a second mobile device of the one or more other mobile devices from the list of suggested recipients. The second mobile device can be selected in various ways, e.g., via a touch screen from a drop-down list or via a voice command identifying which item in the list is to be selected. In some embodiments, the list can allow scrolling to view additional recipients that are not initially displayed on the screen. Thus, the contact information corresponding to the second mobile device may not initially be displayed, but is still part of the list of suggested recipients.

At block 1480, the communication application sends the new communication to the second mobile device. The transmission of the new communication can occur in response to a send command from the user. When an incoming message from the second mobile device includes a network address, the new communication can be transmitted to that network address.

As part of method 1400, a ranging operation may be performed and may occur at various times. In various examples, the ranging operation can be performed in response to the command at block 1420, in parallel with the detection of the incoming message(s) at block 1430, responsive to block 1430, or responsive to an authentication in block 1440. The ranging operation may be performed in various ways, e.g., as described herein. In some implementations, a first wireless protocol (e.g., UWB) can be used to transmit a first set of one or more pulses in a ranging request message to each of the one or more other mobile devices. Such transmission(s) can use network address(es) that are received in the incoming messages. Using the first wireless protocol, a second set of one or more pulses in one or more ranging response messages can be received from each of the one or more other mobile devices. Then, distance information corresponding to one or more transmission times of the first set of one or more pulses and one or more reception times of the second set of one or more pulses for each of the one or more other mobile devices can be determined. Such times can be tracked using a clock of the first device. The list of suggested recipients can be determined using the distance information, e.g., as described for FIGS. 12 and 13.

The distance information can include various distances, e.g., radial and angular, at least some of which may be quantified by time or length. A distance for the one or more other mobile devices can be compared to a threshold. Any of the one or more other mobile devices can be excluded from the list of suggested recipients based on the distance being greater than the threshold. If the neighboring device is too far away, it can be assumed that the user of the first device is likely not trying to communicate with the user of that neighboring device.

When the distance information includes an angular value (e.g., relative to a pointing direction), the angular value for the one or more other mobile devices can be compared to a threshold. Any of the one or more other mobile devices can be excluded from the list of suggested recipients based on the angular value being greater than the threshold.

Before the ranging operation is performed, the first device can perform authentication (e.g., mutual authentication) with the one or more other mobile devices. For example, prior to transmitting the first set of one or more pulses to each of the one or more other mobile devices, an advertisement signal that includes a first authentication tag of the first mobile device can be transmitted via a second wireless protocol (e.g., Bluetooth or Wi-Fi). A second authentication tag of the second mobile device can be received via the second wireless protocol from the second mobile device. The authentication tags (e.g., as described in sections II-IV) can correspond to the identifier(s) in block 1440. The second mobile device can be authenticated using the second authentication tag. The second mobile device can use the first authentication tag to authenticate the first mobile device. Then, the second wireless protocol can be used to communicate one or more ranging settings with the second mobile device. The first set of one or more pulses can be transmitted in accordance with the one or more ranging settings. The first wireless protocol can use a pulse width that is less than a pulse width used by the second wireless protocol.

VIII. Handoff

It can be desirable to transfer content from one device to another device. The two devices may be owned by the user or by different users. There are simplistic ways to transfer content, e.g., by emailing the content so that the other device can retrieve it from a server. But, such a process is inefficient and cumbersome to a user.

In some embodiments, a ranging operation can be used to determine a distance between the devices. After an authentication has been performed, the screen of a first device can automatically provide the option to view content from a second device. In this manner, the user does not need to make selections on the second device or configure the first device. Instead, the user can quickly select the option to view the content. Further, the ranging operation can be used to only provide the option to view the content under certain circumstances, e.g., the distance between the devices is within a threshold. Additionally, an orientation can be required, e.g., the second device being placed on the left side of the first device. Thus, embodiments can suppress unnecessary and undesirable instances of providing the option to the user, which might otherwise clutter the screen of the first device.

A. Example with Phone and Laptop Computer

Figure 15:
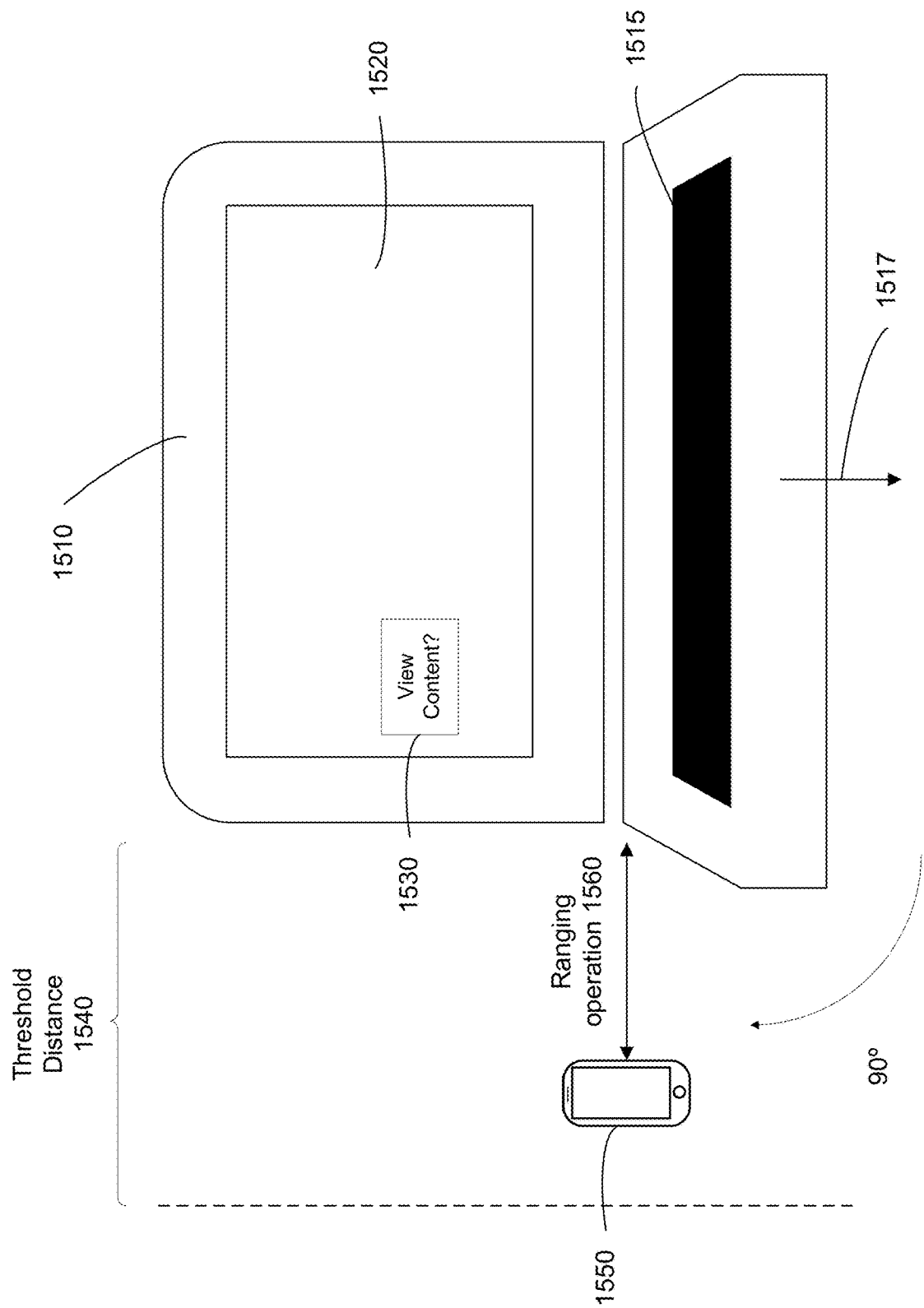
FIG. 15 illustrates a technique for sharing content from one device to another device according to embodiments of the present disclosure.

FIG. 15 illustrates a technique for sharing content from one device to another device according to embodiments of the present disclosure. The two devices can be owned by the same user or by different users. In the example shown, a computer 1510 (also referred to as a first device) interacts with a mobile phone 1550 (also referred to as a second mobile device). However, it should be understood that other mobile devices may be used and other devices, besides a laptop/notebook computer, may correspond to the first device, e.g., a tablet, a wearable device, a TV or set top box for a TV, etc.

To determine the user's intent to share content from mobile phone 1550 to computer 1510, a proximity of the two devices can be used. To determine the proximity, a ranging operation 1560 can be performed between mobile phone 1550 and computer 1510. Either of the devices may instigate ranging operation 1560, e.g., as described herein. Accordingly, computer 1510 can determine a radial distance between the two devices. Further, in some embodiments, computer 1510 can determine a relative position of mobile phone 1550 to computer 1510, e.g., by determining an angular position. Such an angular position can be defined with respect to a defined pointing direction, such as perpendicular to a keyboard 1515. If the angle is determined clockwise, mobile phone 1550 is at 90° from pointing direction 1517.

As part of determining the user's intent to share content, a threshold distance 1540 can be used. For example, when computer 1510 determines that mobile phone 1550 is within threshold distance 1540, computer 1510 can determine that the user has a high likelihood of wanting to share content. In response to determining that mobile phone 1550 is within threshold distance 1540, computer 1510 can display a visual indicator 1530 on screen 1520 of computer 1510. A size and placement of visual indicator 1530 can vary, and the example shown is merely illustrative. For example, visual indicator 1530 can be an icon that is placed on a start menu or other list of currently or recently used applications; such an icon can correspond to mobile phone 1550 or whatever the second mobile device is.

In some embodiments, threshold distance 1540 can depend on an angular position/distance of mobile phone 1550 relative to computer 1510. For example, computer 1510 can require that mobile phone 1550 be placed on the left side of computer 1510. In this manner, computer 1510 can require more specific actions to show user intent. The determination that mobile phone 1550 is on the left side can be determined using the measured angle, which can be required to be within a specified range, such as between 45° and 135°; other ranges may also be used, as will be appreciated by the skilled person. In such an implementation that uses a direction, visual indicator 1530 can be displayed on a particular location of screen 1520, e.g., on the left side, as shown.

Accordingly, the user can put their phone next to their computer for the purpose of starting a sharing session between the two devices. Computer 1510 can detect an advertisement signal from mobile phone 1550 (or vice versa), and ranging operation 1560 can provide distance information that triggers visual indicator 1530 on computer 1510. Once the user selects visual indicator 1530, the sharing session can begin. In various embodiments, the sharing session can transmit photos, videos, links to such content (URLs on the Internet), or deep links to software applications that are installed on both devices. Depending on what is being shared, various steps can be performed in the sharing session, e.g., launching application corresponding to or for displaying the content, displaying the content (e.g., a photo), or saving the content on computer 1510.

In some embodiments, visual indicator 1530 can convey information about the content being shared. For example, visual indicator 1530 can provide a small representation of the content, e.g., a thumbnail of a photograph. Once the user clicks on visual indicator 1530, a larger representation of the content can be provided, e.g., full-screen, half screen, or a size corresponding to a ⅓ or a ¼ of the screen can be used. In other implementations, the content can be shared automatically, e.g., without a user having to select a visual indicator.

The instigation of a sharing session or display of visual indicator 1530 can also depend on an orientation of mobile phone 1550. For example, it can be require that the user placed the device with the screen facing up in order to indicate a desire to start a sharing session. Such a determination of orientation can be made by mobile phone 1550, e.g., using a gyroscope or other measurement device. The measured orientation or other indicator (e.g., a flag) that the orientation satisfies one or more criteria can be provided from mobile phone 1550 to computer 1510.

B. Method for Sharing Content

Figure 16:
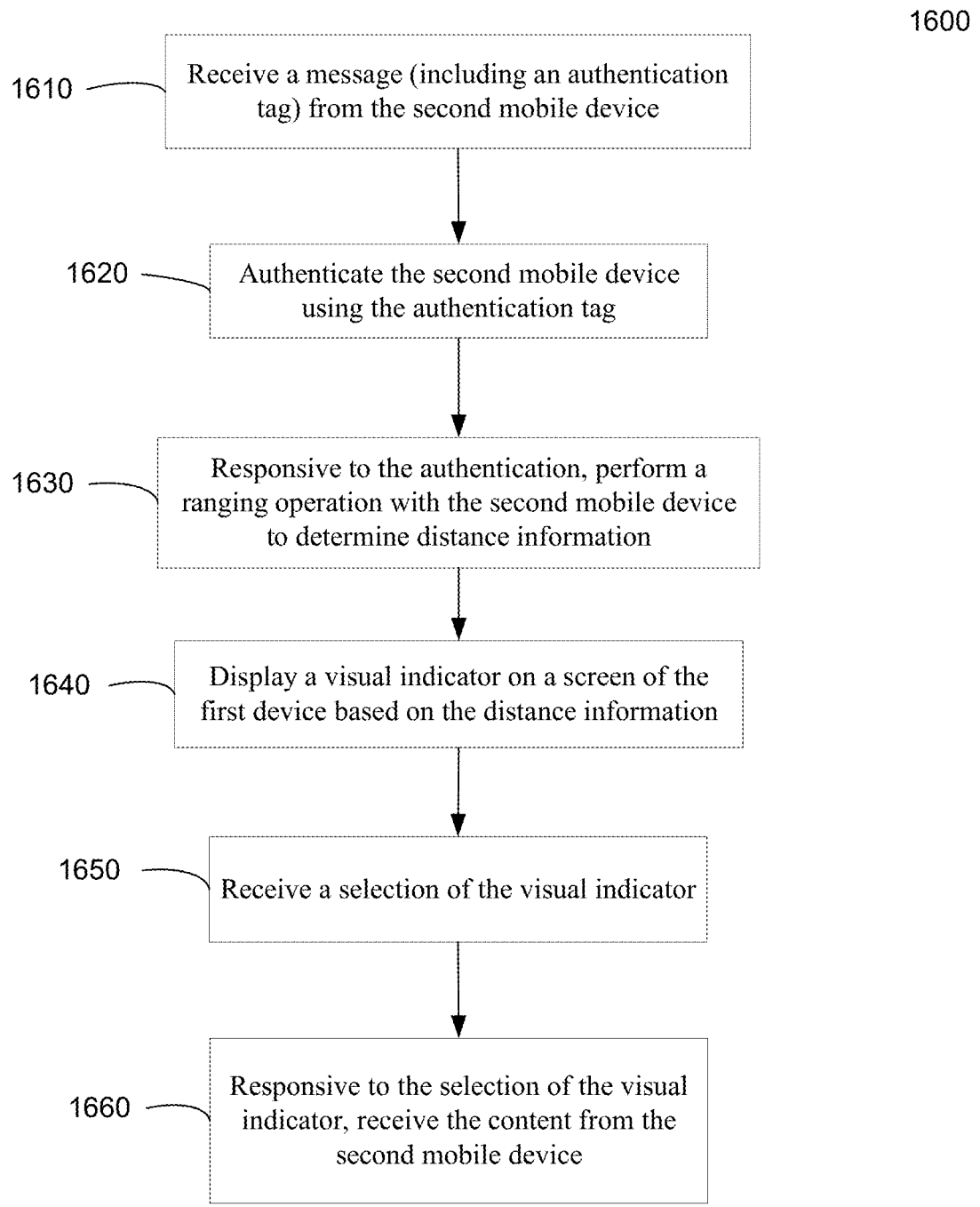
FIG. 16 is a flowchart illustrating a method for communicating between a first device and a second mobile device according to embodiments of the present disclosure.

FIG. 16 is a flowchart illustrating a method 1600 for communicating between a first device and a second mobile device according to embodiments of the present disclosure. The two devices can be owned by the same user or by different users. Method 1600 may be performed by a first device, e.g., computer 1510 in FIG. 15. The second mobile device may be a mobile phone (e.g., mobile phone 1550) or other mobile device, e.g., a wearable device, such as a watch.

At block 1610, the first device receives a message from the second mobile device. The message can include an authentication tag that can be used to authenticate the second mobile device. In this manner, a sharing session would not occur to a device of an unknown person.

The message may be an advertisement signal broadcast from the second mobile device, e.g., broadcast periodically. As another example, the message could be a response to a message sent by the first device. As a response message, the second mobile device may include further information, e.g., ranging settings for performing a ranging operation.

At block 1620, the second mobile device is authenticated using the authentication tag. As described herein, the authentication can be performed in various ways. For example, the authentication can be performed by accessing a contact database to confirm the authentication tag corresponds to a contact or by verifying a digital signature, a hash, or other cryptographic value. To perform the authentication, some embodiments can store, in a memory of the first device, an identifier associated with the second mobile device, and compare the authentication tag to the stored identifier for authenticating the second mobile device.

In other embodiments, the message includes a payload and a digital signature, where the payload includes the authentication tag and the digital signature is generated from at least a portion of the payload. A memory of the first device can store an identifier (e.g., the authentication tag of the second mobile device) associated with a cryptographic key corresponding to the second mobile device. The authentication process can access the memory using the authentication tag to find a contact to which the authentication tag matches the stored identifier, so that the corresponding cryptographic key can be obtained. The digital signature can be verified using the cryptographic key, e.g., by decrypting the digital signature and comparing to the portion of the payload used to generate the digital signature. Other verification techniques described herein may also be used.

At block 1630, responsive to authenticating the second mobile device, the first device performs a ranging operation with the second mobile device to determine distance information. The distance information can be of various types, as is described herein. For example, the distance information may include times, a radial distance, an angular distance, a relative position, etc. The authentication and the ranging can be performed using different wireless protocols, as is described herein. For example, the message received in block 1610 can be received using Bluetooth or Wi-Fi, and the ranging operation can be performed using UWB.

In some implementations, the ranging operation can measure signal strength (e.g., RSSI) of one or more messages transmitted between the second mobile device and the first device. In one implementation, the ranging operation can measure a time of flight of one or more messages transmitted between the second mobile device and the first device.

At block 1640, a visual indicator is displayed on a screen of the first device based on the distance information. For example, the visual indicator can be displayed at a particular location on the screen based on the distance information. For instance, the distance information can be used to determine a direction of the second mobile device relative to the first device, and a position of the visual indicator on the screen can be selected based on the direction. As another example, the visual indicator can be displayed when the distance information satisfies one or more criteria. In some implementations, the distance information specifies a distance value (e.g., a length and/or an angle), which is compared to a threshold. When the distance value is less than the threshold, the visual indicator can be displayed.

The visual indicator can indicate that content from the second mobile device is available. For example, the visual indicator can convey that the content may be obtained from the second mobile device for saving or displaying on the first device. The visual indicator itself can indicate that content from the second mobile device is displayable on the screen of the first device, e.g., by showing an image.

At block 1650, a selection of the visual indicator is received. The selection may be made in various ways, e.g., by voice command, by selecting the visual indicator on a touch screen, by selecting the visual indicator using a pointing device, and the like. In some implementations, a cursor or other pointing element can automatically switch to the visual indictor, so that a user may only need to push a button.

At block 1660, responsive to the selection of the visual indicator, the content is received from the second mobile device. The receiving can be implemented in various ways, e.g., so that the content is saved on the first device or so that the content is displayed on a screen of the first device. The receiving of the content can cause other content to be retrieved, e.g., of the content is a URL to other content, e.g., on the Internet.

IX. Example Architecture

As described in FIGS. 5, 8, 12, and 13, a computing device may have various components that determine proximity (e.g., ranging circuitry using time-of-flight (TOF) or signal strength) and that use such proximity information. Various application may use the proximity information in various ways. An example architecture is now described that may be implemented with any of the various methods, devices, and systems provided herein.

Figure 17:
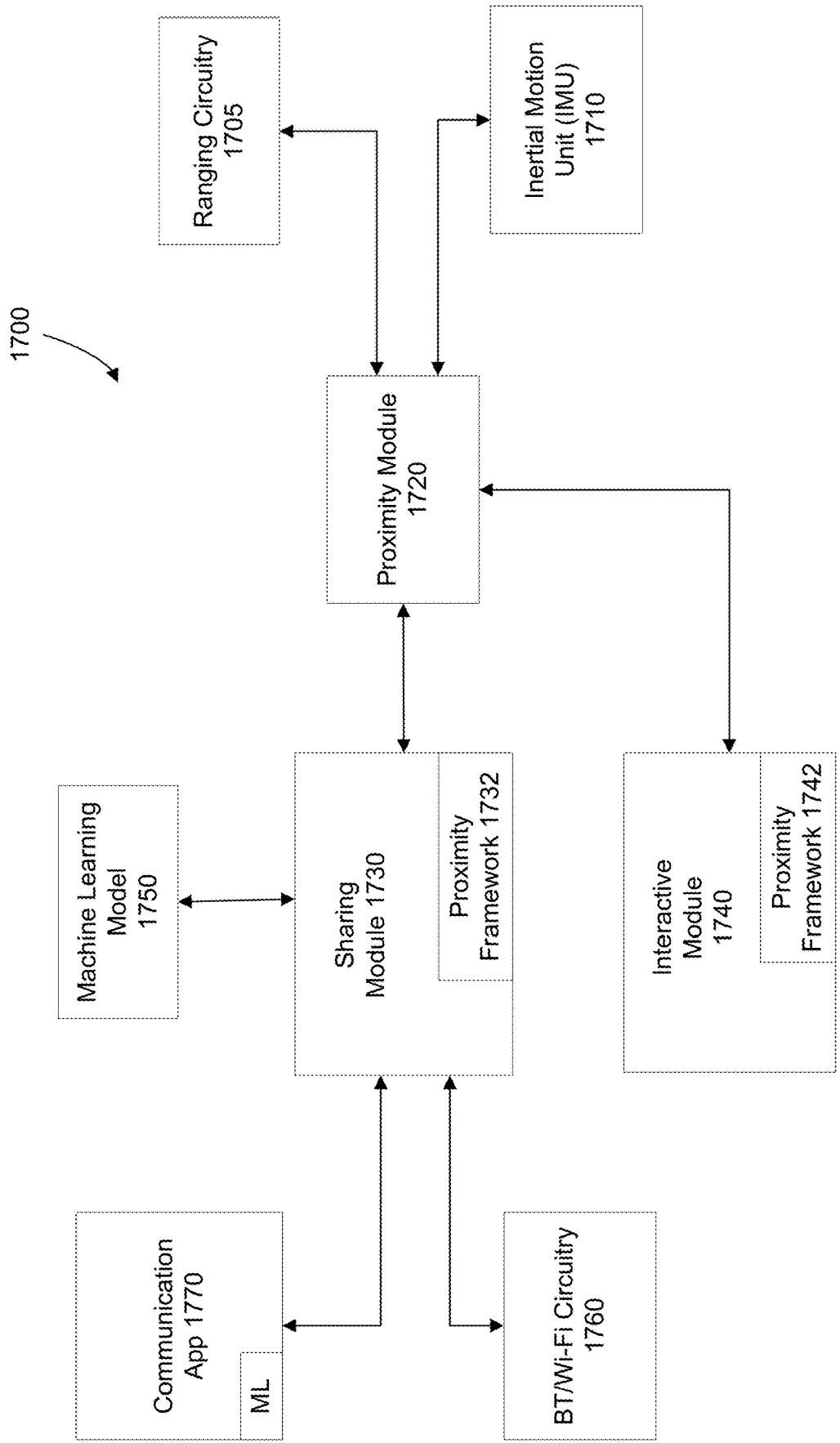
FIG. 17 shows an example architecture for using ranging information according to embodiments of the present disclosure.

FIG. 17 shows an example architecture 1700 for using ranging information according to embodiments of the present disclosure. Example architecture 1700 can be implemented in a first device that performs ranging with a second device, as is described herein. The ranging may be performed at the request of a number of client applications, e.g., communication application 1770, sharing module 1730, or interactive module 1740, which are described in more detail below.

Ranging circuitry 1705 can perform ranging operations as described herein, e.g., performing TOF measurements. Ranging circuitry 1705 can provide ranging information to a proximity module 1720, which can analyze the ranging information. As examples, the ranging information can include transmission and reception times, distances, and intensity of signals. Ranging circuitry 1705 can perform some adjustments to the ranging information, e.g., by correcting for antenna phase effects due to the angle of arrival, range bias (e.g., if there is a fixed offset), or do a self-calibration, but proximity module 1720 can provide more complex analysis.

Proximity module 1720 can provide commands to ranging circuitry 1705 to coordinate different modes or settings for performing the ranging. For example, proximity module 1720 can ask for more measurements or to change a mode/setting to get more accurate measurements, or to potentially reduce power used to obtain the measurements. An example of a mode is whether one-to-one ranging, one-to-many ranging, or many-to-many ranging is used. Other modes can include a point-to-share mode, a notification mode, or a recipient suggestion mode. Accordingly, a resolution of measurements can be set for ranging circuitry 1705, e.g., from coarse to fine measurements. Such resolution may result in varying numbers of rounds of messages being exchanged between the two devices as part of a ranging operation.

As example of analysis performed by proximity module 1720 includes additional filtering, e.g., to reduce the measurement noise on ranging circuitry 1705. Such a setting may be used when an application needs high accuracy. A minimal amount of analysis may be performed when the ranging information is needed as fast as possible.

In some embodiments, proximity module 1720 can use measurements from initial motion unit (IMU) 1710, which can include sensors, such as an accelerometer, gyroscope, and a magnetometer. Proximity module 1720 can determine or update distance values (e.g., radial or angular distance). The processing performed by proximity module 1720 can depend on which client application(s) are requesting ranging information.

Proximity module 1720 can provide distance information to client applications, such as communication application 1770 (e.g., email or text messages), sharing module 1730, or interactive module 1740. The distance information can be provided directly to such client applications or via other software modules. For example, the distance information can be provided directly to communication application 1770 or via sharing module 1730. Communication application 1770 can correspond to communication application 1211 or communication application 1311. Sharing module 1730 can be used in implementing techniques described in FIGS. 6-8. In some embodiments, an interactive module 1740 can use ranging information obtained in a many-to-many ranging mode. For example, interactive module 1740 can be used when augmented reality applications on neighboring mobile devices are used simultaneously.

BT/Wi-Fi circuitry 1760 can be used for authentication (e.g., as described herein) as well as proximity measurements, e.g., using RSSI. Machine learning model 1750 can provide suggestions, e.g., suggested recipients as described in FIGS. 12 and 13. Machine learning model 1750 may be implemented at various locations in example architecture 1700, e.g., in communication application 1770.

A proximity framework 1732 and a proximity framework 1742 can reside within respective modules and be used to communicate with proximity module 1720. This premise can perform additional processing, e.g., as may be needed by the respective modules. For example, proximity framework 1732 can determine scores for neighboring mobile devices based on the distance information, as is described herein. Further, proximity framework 1732 can perform the classification on BT RSSI, as described for RSSI classifier 1355 of FIG. 13. The proximity frameworks can be implemented in any other number of client applications that use ranging information.

Sharing module 1730 can use an address (e.g. a media access control (MAC) address) obtained from BT Wi-Fi circuitry 1716 and correlate it with an address obtained from ranging circuitry 1705. This bundle of correlated data can then be combined with other data (e.g., contact information and historical data) and provided to machine learning model 1750 or communication application 1770, or other modules. In some embodiments where recipients are suggested, a trigger command can be provided from communication application 1770 to sharing module 1730 and on to other components to perform operation to suggest recipients for a new communication.

X. Example Device

Figure 18:
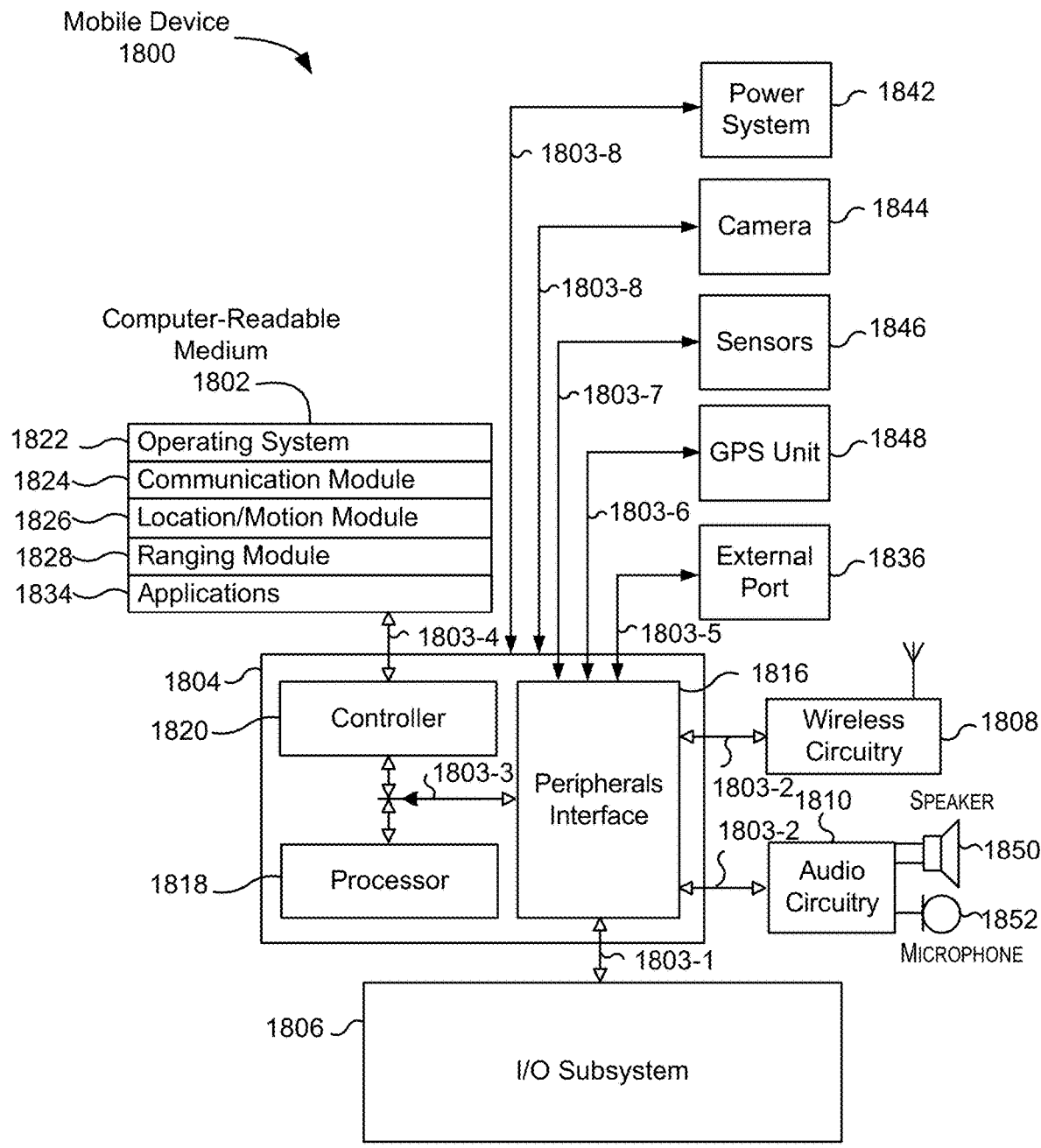
FIG. 18 is block diagram of an example device according to embodiments of the present disclosure.

FIG. 18 is a block diagram of an example electronic device 1800. Device 1800 generally includes computer-readable medium 1802, a processing system 1804, an Input/Output (I/O) subsystem 1806, wireless circuitry 1808, and audio circuitry 1810 including speaker 1812 and microphone 1814. These components may be coupled by one or more communication buses or signal lines 1803. Device 1800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a headset, or the like, including a combination of two or more of these items.

It should be apparent that the architecture shown in FIG. 18 is only one example of an architecture for device 1800, and that device 1800 can have more or fewer components than shown, or a different configuration of components. The various components shown in FIG. 18 can be implemented in hardware, software, or a combination of both hardware and software, including one or more signal processing and/or application specific integrated circuits.

Wireless circuitry 1808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1808 can use various protocols, e.g., as described herein. In various embodiments, wireless circuitry 1808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1808 is coupled to processing system 1804 via peripherals interface 1816. Peripherals interface 1816 can include conventional components for establishing and maintaining communication between peripherals and processing system 1804. Voice and data information received by wireless circuitry 1808 (e.g., in speech recognition or voice command applications) is sent to one or more processors 1818 via peripherals interface 1816. One or more processors 1818 are configurable to process various data formats for one or more application programs 1834 stored on medium 1802.

Peripherals interface 1816 couple the input and output peripherals of device 1800 to the one or more processors 1818 and computer-readable medium 1802. One or more processors 1818 communicate with computer-readable medium 1802 via a controller 1820. Computer-readable medium 1802 can be any device or medium that can store code and/or data for use by one or more processors 1818. Computer-readable medium 1802 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1816, one or more processors 1818, and controller 1820 can be implemented on a single chip, such as processing system 1804. In some other embodiments, they can be implemented on separate chips.

Processor(s) 1818 can include hardware and/or software elements that perform one or more processing functions, such as mathematical operations, logical operations, data manipulation operations, data transfer operations, controlling the reception of user input, controlling output of information to users, or the like. Processor(s) 1818 can be embodied as one or more hardware processors, microprocessors, microcontrollers, field programmable gate arrays (FPGAs), application-specified integrated circuits (ASICs), or the like.

Device 1800 also includes a power system 1842 for powering the various hardware components. Power system 1842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1800 includes a camera 1844. In some embodiments, device 1800 includes sensors 1846. Sensors can include accelerometers, compass, gyrometer, pressure sensors, audio sensors, light sensors, barometers, and the like. Sensors 1846 can be used to sense location aspects, such as auditory or light signatures of a location.

In some embodiments, device 1800 can include a GPS receiver, sometimes referred to as a GPS unit 1848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1818 run various software components stored in medium 1802 to perform various functions for device 1800. In some embodiments, the software components include an operating system 1822, a communication module 1824 (or set of instructions), a location module 1826 (or set of instructions), a ranging module 1828 that is used as part of ranging operation described herein, and other application programs 1834 (or set of instructions).

Operating system 1822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1824 facilitates communication with other devices over one or more external ports 1836 or via wireless circuitry 1808 and includes various software components for handling data received from wireless circuitry 1808 and/or external port 1836. External port 1836 (e.g., USB, FireWire, Lightning connector, 60-pin connector, etc.) is adapted for coupling directly to other devices or indirectly over a network (e.g., the Internet, wireless LAN, etc.).

Location/motion module 1826 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1826 receives data from GPS unit 1848 and analyzes the signals to determine the current position of the mobile device. In some embodiments, location/motion module 1826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1808 and is passed to location/motion module 1826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1800 based on the position coordinates of the corresponding transmitters. Regardless of the specific location technology used, location/motion module 1826 receives information from which a location fix can be derived, interprets that information, and returns location information, such as geographic coordinates, latitude/longitude, or other location fix data Ranging module 1828 can send/receive ranging messages to/from an antenna, e.g., connected to wireless circuitry 1808. The messages can be used for various purposes, e.g., to identify a sending antenna of a device, determine timestamps of messages to determine a distance of mobile device 1800 from another device. Ranging module 1828 can exist on various processors of the device, e.g., an always-on processor (AOP), a UWB chip, and/or an application processor. For example, parts of ranging module 1828 can determine a distance on an AOP, and another part of the ranging module can interact with a sharing module, e.g., to display a position of the other device on a screen in order for a user to select the other device to share a data item. Ranging module 1828 can also interact with a reminder module that can provide an alert based on a distance from another mobile device.

The one or more applications 1834 on device 1800 can include any applications installed on the device 1800, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1806 can include a display and user input devices such as a keyboard, mouse, and/or trackpad. In some embodiments, I/O subsystem 1806 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1806 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method for communicating between a first device and a second mobile device, the method comprising performing, by the first device:
    receiving, via a first wireless protocol, an advertising message from the second mobile device, the message including an authentication tag;
    authenticating the second mobile device using the authentication tag;
    responsive to authenticating the second mobile device, performing a ranging operation with the second mobile device to determine distance information, wherein the ranging operation comprises:
        transmitting by the first device, using a second wireless protocol, a first set of one or more pulses in a ranging request message to the second mobile device in accordance with one or more ranging settings, wherein the second wireless protocol uses a pulse width that is less than a pulse width used by the first wireless protocol;
    displaying a visual indicator on a screen of the first device based on the distance information, wherein the visual indicator indicates that content from the second mobile device is available;
    receiving a selection of the visual indicator; and
    responsive to the selection of the visual indicator, receiving the content from the second mobile device.

2. The method of claim 1, wherein the content from the second mobile device is displayed on a screen of the first device in response to the selection of the visual indicator.

3. The method of claim 1, wherein the visual indicator indicates that the content from the second mobile device is displayable on the screen of the first device.

4. The method of claim 1, wherein the message includes a payload and a digital signature, the payload including the authentication tag, wherein the digital signature is generated from at least a portion of the payload, the method further comprising:
    storing, in a memory of the first device, an identifier associated with a cryptographic key corresponding to the second mobile device,
    wherein authenticating the second mobile device includes:
        accessing, the memory, using the authentication tag to match to the identifier and obtain the cryptographic key, and
        verifying the digital signature using the cryptographic key.

5. The method of claim 1, wherein the ranging operation measures signal strength of one or more messages transmitted between the second mobile device and the first device.

6. The method of claim 1, wherein the ranging operation measures a time of flight of one or more messages transmitted between the second mobile device and the first device.

7. The method of claim 1, wherein the distance information specifies a distance value, the method further comprising:
    determining the distance value is less than a threshold, wherein the visual indicator is displayed responsive to the distance value being less than the threshold.

8. The method of claim 1, further comprising:
    determining, using the distance information, a direction of the second mobile device relative to the first device; and
    selecting a position of the visual indicator on the screen based on the direction.

9. The method of claim 1, wherein the first device is a device of a first user and the second mobile device is a device of a second user.

10. The method of claim 1, wherein the authentication tag is generated by an authentication server, wherein an identifier associated with the second mobile device is stored in a memory of the one or more memories, and wherein authenticating the second mobile device includes comparing the authentication tag to the identifier stored in the memory.

11. The method of claim 10, wherein the first device and the second mobile device are registered beforehand with the authentication server.

12. A first mobile device, comprising:
    one or more memories configured to store processor-executable instructions; and
    one or more processors in communication with the one or more memories and configured to execute the instructions stored in the one or more memories to perform operations including:
        receiving, via a first wireless protocol, an advertising message from a second mobile device, the message including an authentication tag;
        authenticating the second mobile device using the authentication tag;
        responsive to authenticating the second mobile device, performing a ranging operation with the second mobile device to determine distance information, wherein the ranging operation comprises:
            transmitting by the first mobile device, using a second wireless protocol, a first set of one or more pulses in a ranging request message to the second mobile device in accordance with one or more ranging settings, wherein the second wireless protocol uses a pulse width that is less than a pulse width used by the first wireless protocol;

displaying a visual indicator on a screen of the first mobile device based on the distance information, wherein the visual indicator indicates that content from the second mobile device is available;

receiving a selection of the visual indicator; and responsive to the selection of the visual indicator, receiving the content from the second mobile device.

13. The first mobile device of claim 12, wherein the content from the second mobile device is displayed on a screen of the first mobile device in response to the selection of the visual indicator.

14. The first mobile device of claim 12, wherein the visual indicator indicates that the content from the second mobile device is displayable on the screen of the first mobile device.

15. The first mobile device of claim 12, wherein the message includes a payload and a digital signature, the payload including the authentication tag, wherein the digital signature is generated from at least a portion of the payload, and wherein the one or more processors are further configured for executing the instructions stored in the one or more memories to perform operations including:

storing, in one or more memories of the first mobile device, an identifier associated with a cryptographic key corresponding to the second mobile device, wherein authenticating the second mobile device includes:

accessing, the one or more memories, using the authentication tag to match to the identifier and obtain the cryptographic key, and verifying the digital signature using the cryptographic key.

16. The first mobile device of claim 12, wherein the ranging operation measures signal strength of one or more messages transmitted between the second mobile device and the first mobile device.

17. The first mobile device of claim 12, wherein the ranging operation measures a time of flight of one or more messages transmitted between the second mobile device and the first mobile device.

18. The first mobile device of claim 12, wherein the distance information specifies a distance value, and wherein the one or more processors are further configured for executing the instructions stored in the one or more memories to perform operations including:

determining the distance value is less than a threshold, wherein the visual indicator is displayed responsive to the distance value being less than the threshold.

19. The first mobile device of claim 12, wherein the one or more processors are further configured for executing the instructions stored in the one or more memories to perform operations including:

determining, using the distance information, a direction of the second mobile device relative to the first mobile device; and selecting a position of the visual indicator on the screen based on the direction.

20. The first mobile device of claim 12, wherein the message received from the second mobile device is received from a second user.

* * * * *